United States Patent
Pattar et al.

(10) Patent No.: US 9,253,643 B2
(45) Date of Patent: Feb. 2, 2016

(54) METHOD AND APPARATUS FOR H(E)NB INTEGRITY VERIFICATION AND VALIDATION

(75) Inventors: Sudhir B. Pattar, Mount Laurel, NJ (US); Inhyok Cha, Yardley, PA (US); Andreas U. Schmidt, Frankfurt am Main (DE); Andreas Leicher, Frankfurt am Main (DE); Yogendra C. Shah, Exton, PA (US); Dolores F. Howry, Wayne, PA (US); David G. Greiner, New Hyde Park, NY (US); Lawrence L. Case, Royersford, PA (US); Michael V. Meyerstein, Ipswich (GB); Louis J. Guccione, East Chester, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 163 days.

(21) Appl. No.: 12/718,572

(22) Filed: Mar. 5, 2010

(65) Prior Publication Data
US 2011/0041003 A1 Feb. 17, 2011

Related U.S. Application Data

(60) Provisional application No. 61/157,833, filed on Mar. 5, 2009, provisional application No. 61/222,067, filed on Jun. 30, 2009, provisional application No. 61/235,793, filed on Aug. 21, 2009, provisional application No. 61/239,698, filed on Sep. 3, 2009.

(51) Int. Cl.
*G06F 11/20* (2006.01)
*H04W 12/10* (2009.01)

(52) U.S. Cl.
CPC .................... *H04W 12/10* (2013.01)

(58) Field of Classification Search
CPC .............................. H04W 12/10; H04L 63/08
USPC ................................................. 726/4, 10, 12
See application file for complete search history.

(56) References Cited

U.S. PATENT DOCUMENTS

| | | | |
|---|---|---|---|
| 6,731,932 B1 | 5/2004 | Rune et al. | |
| 7,017,155 B2 | 3/2006 | Peev et al. | |
| 7,653,819 B2 * | 1/2010 | Bade et al. | 713/187 |
| 7,711,960 B2 * | 5/2010 | Scarlata | 713/182 |
| 7,752,465 B2 * | 7/2010 | Ebringer et al. | 713/194 |
| 7,853,804 B2 * | 12/2010 | Cromer et al. | 713/193 |
| 7,908,483 B2 * | 3/2011 | Iliev et al. | 713/176 |

(Continued)

FOREIGN PATENT DOCUMENTS

| | | |
|---|---|---|
| CN | 1933651 | 3/2007 |
| CN | 101043338 | 9/2007 |

(Continued)

OTHER PUBLICATIONS

Trusted Computing Challenges. AMD presentation, Leendert van Doorn, Nov. 2007.*

(Continued)

*Primary Examiner* — Saleh Najjar
*Assistant Examiner* — Oleg Korsak
(74) *Attorney, Agent, or Firm* — Baker & Hostetler LLP

(57) ABSTRACT

An apparatus and method for providing home evolved node-B (H(e)NB) integrity verification and validation using autonomous validation and semi-autonomous validation is disclosed herein.

24 Claims, 23 Drawing Sheets

(56) References Cited

U.S. PATENT DOCUMENTS

| | | | |
|---|---|---|---|
| 7,930,733 B1* | 4/2011 | Iftode et al. | 726/5 |
| 8,108,668 B2* | 1/2012 | Rozas | 713/155 |
| 8,914,674 B2 | 12/2014 | Shah et al. | |
| 2003/0119481 A1 | 6/2003 | Haverinen et al. | |
| 2004/0153667 A1 | 8/2004 | Kastelewicz et al. | |
| 2005/0033987 A1 | 2/2005 | Van et al. | |
| 2006/0074600 A1 | 4/2006 | Sastry et al. | |
| 2006/0137022 A1 | 6/2006 | Kilian-Kehr et al. | |
| 2006/0200856 A1* | 9/2006 | Salowey | H04L 9/32 726/5 |
| 2007/0050678 A1 | 3/2007 | Estes et al. | |
| 2007/0075216 A1 | 4/2007 | Tohma | |
| 2007/0113120 A1 | 5/2007 | Dodge | |
| 2007/0143629 A1 | 6/2007 | Hardjono et al. | |
| 2007/0157022 A1 | 7/2007 | Blom et al. | |
| 2008/0046786 A1 | 2/2008 | Patel et al. | |
| 2008/0076419 A1 | 3/2008 | Khetawat et al. | |
| 2008/0076425 A1 | 3/2008 | Khetawat et al. | |
| 2008/0233963 A1 | 9/2008 | Alanara et al. | |
| 2008/0301784 A1 | 12/2008 | Zhu et al. | |
| 2009/0013210 A1 | 1/2009 | McIntosh et al. | |
| 2010/0169967 A1* | 7/2010 | Khosravi et al. | 726/22 |
| 2011/0010543 A1 | 1/2011 | Schmidt et al. | |
| 2011/0044454 A1 | 2/2011 | Baek et al. | |
| 2011/0179477 A1* | 7/2011 | Starnes et al. | 726/9 |
| 2011/0265158 A1 | 10/2011 | Cha et al. | |

FOREIGN PATENT DOCUMENTS

| | | |
|---|---|---|
| CN | 101043338 A | 9/2007 |
| EP | 1533695 | 5/2005 |
| JP | 2003-208316 | 7/2003 |
| JP | 2005-521928 | 7/2005 |
| JP | 2005-536934 | 12/2005 |
| JP | 2006-287339 | 10/2006 |
| JP | 2007-072909 | 3/2007 |
| JP | 2007-515708 | 6/2007 |
| JP | 2007-522695 | 8/2007 |
| JP | 2012-520024 | 8/2012 |
| WO | WO 2002-056133 | 7/2002 |
| WO | WO 2003-069922 | 8/2003 |
| WO | WO 2004-019582 | 3/2004 |
| WO | WO 2005-050441 | 6/2005 |
| WO | WO 2007-039757 | 4/2007 |
| WO | WO 2007-110094 | 10/2007 |
| WO | WO 2007/110094 A1 | 10/2007 |
| WO | WO 2008-001322 | 1/2008 |
| WO | WO 2008/082587 | 7/2008 |
| WO | WO 2008-082587 | 7/2008 |
| WO | WO 2008-125657 | 10/2008 |
| WO | WO 2008/125657 | 10/2008 |
| WO | WO 2009-092115 | 7/2009 |
| WO | WO 2010-102222 | 9/2010 |
| WO | WO 2010/102222 | 9/2010 |
| WO | WO 2010-102259 | 9/2010 |
| WO | WO 2010/102259 | 9/2010 |

OTHER PUBLICATIONS

Trusted Computing Platforms: TCPA Technology in Context by: Siani Pearson, et al., Pub. Date: Jul. 22, 2002.*
3GPP TSG RAN WG3 Meeting, Sophia Antipolis, France, Jun. 11-12, 2008.*
Trusted Computing Platforms: TCPA Technology in Context by: Siani Pearson, et al., Pub. Date: Jul. 22, 2002. Chapter 6, pp. 106-109.*
Pearson, et al. "Trusted Computing Platforms: TCPA Technology in Context" by: Siani Pearson, et al., Pub. Date: Jul. 22, 2002, p. 39.*
Kaufman, "Internet Key Exchange (IKEv2) Protocol," Network Working Group, RFC-4306 (Dec. 2005).
Sailer et al., "Design and Implementation of a TCG-Based Integrity Measurement Architecture," Proceedings of the 13th USENIX Security Symposium (2004).
Schmidt et al., "Trust for Location-based Authorisation," IEEE Communication Society (2008).
Third Generation Partnership Project, "Technical Specification Group Service and Systems Aspects; Security of H(e)NB; (Release 8)," 3GPP TR 33.820 v8.3.0 (Dec. 2009).
Third Generation Partnership Project, "Technical Specification Group Service and Systems Aspects; Security of H(e)NB; (Release 8)," 3GPP TR 33.820 v1.3.0 (Jan. 2009).
Third Generation Partnership Project, "Technical Specification Group Service and System Aspects; Network Domain Security (NDS); Authentication Framework (AF) (Release 9)," 3GPP TS 33.310 V9.1.0 (Dec. 2009).
Third Generation Partnership Project, "Technical Specification Group Service and System Aspects; Network Domain Security (NDS); Authentication Framework (AF) (Release 9)," 3GPP TS 33.310 V8.2.1 (Mar. 2008).
Third Generation Partnership Project, "Technical Specification Group Service and System Aspects; 3G Security; Wireless Local Area Network (WLAN) interworking security (Release 8)," 3GPP TS 33.234 V8.1.0 (Mar. 2008).
Third Generation Partnership Project, "Technical Specification Group Service and System Aspects; 3G Security; Wireless Local Area Network (WLAN) interworking security (Release 9)," 3GPP TS 33.234 V9.0.0 (Sep. 2009).
Third Generation Partnership Project, "Technical Specification Group Services and System Aspects; Feasibility Study on the Security Aspects of Remote Provisioning and Change of Subscription for M2M Equipment; (Release 9)," 3GPP TR 33.812 V9.0.0 (Dec. 2009).
Third Generation Partnership Project, "Technical Specification Group Services and System Aspects; Feasibility Study on the Security Aspects of Remote Provisioning and Change of Subscription for M2M Equipment; (Release 8)," 3GPP TR 33.812 V9.0.0 (Sep. 2008).
Third Generation Partnership Project, "Technical Specification Group Services and System Aspects; Telecommunication management; Home Node B (HNB) Operations, Administration, Maintenance and Provisioning (OAM&P); Procedure flows for Type 1 interface HNB to HNB Management System (HMS) (Release 9)," 3GPP TS 32.583 V9.2.0 (Dec. 2009).
Trusted Computing Group, "TCG Mobile Reference Architecture," Specification version 1.0, Revision 1 (Jun. 2007).
International Patent Application No. PCT/US2010/026384: International Search Report, dated Sep. 2, 2010, 15 pages.
Dijk et al., "Securing Shared Untrusted Storage by Using TPM 1.2 without Requiring a Trusted OS", Technical Report MIT CSAIL CSG Technical Memo, May 2007, 24 pages.
Pearson et al., "Trusted Computing Platforms: TCPA Technology in Context", Prentice Hall, Jul. 22, 2002, 11 pages.
Van Doorn, "Trusted Computing Challenges" AMD Presentation, Nov. 2007, 45 pages.
3rd Generation Partnership Project; Technical Specification Group Service and System Aspects; Security of H(e)NB; Release 8; 3GPP TR 33.820 V1.2.0, Dec. 2008, 67 pages.
U.S. Appl. No. 12/718,480: Non-final office action dated Jun. 7, 2012, 20 pages.
U.S. Appl. No. 12/718,480: Final office action dated Sep. 27, 2012, 16 pages.
U.S. Appl. No. 12/718,480: Non-final office action dated Mar. 4, 2013, 17 pages.
U.S. Appl. No. 12/718,480: Final office action dated May 22, 2013, 15 pages.
U.S. Appl. No. 14/699,509, Apr. 29, 2015, Schmidt et al.
U.S. Appl. No. 14/570,301, Dec. 15, 2014, Shah et al.
3rd Generation Partnership Project, 3GPP TR3 3.8 2, 0 v8.3.0 "Technical Specification Group Service and Systems Aspects; Security of H(e)NB; (Release 8)," Dec. 2009.
3rd Generation Partnership Project, 3GPP TR 33.820 v1.3.0 , "Technical Specification Group Service and Systems Aspects; Security of H(e)NB"; (Release 8), Jan. 2009.
3rd Generation Partnership Project, (3 GPP)TS 33.310 V9.1.0, "Technical Specification Group Service and System Aspects; Network Domain Security (NOS); Authentication Framework (AF)" (Release 9), Dec. 2009.

(56) References Cited

OTHER PUBLICATIONS

3rd Generation Partnership Project, (3GPP) TS.33.310 V8.2.1, "Technical Specification Group Service and System Aspects; Network Domain Security (NOS); Authentication Framework (AF)", (Release 9), Mar. 2008.
3rd Generation Partnership Project, (3GPP) TS 33.234 V8.1.0, "Technical Specification Group Service and System Aspects; 3G Security; Wireless Local Area Network (WLAN) Interworking Security", (Release 8), Mar. 2008.
3rd Generation Partnership Project, (3GPP) TS 33.234 V9.0.0, "Technical Specification Group Service and System Aspects; 3G Security; Wireless Local Area Network (WLAN) Interworking Security (Release 9)", Sep. 2009.
3rd Generation Partnership Project, (3GPP) TR 33.812 V9.0.0 , "Technical Specification Group Services and System Aspects; Feasibility Study on the Security Aspects of Remote Provisioning and Change of Subscription for M2M Equipment"; (Release 9), Dec. 2009.
3rd Generation Partnership Project, (3GPP) TR 33.812 V9.0.0, "Technical Specification Group Services and System Aspects; Feasibility Study on the Security Aspects of Remote Provisioning and Change of Subscription for M2M Equipment"; (Release 8) Sep. 2008.
3rd Generation Partnership Project, (3GPP) TS 32.583 V9.2.0, "Technical Specification Group Services and System Aspects; Telecommunication management; Home Node B (HNB) Operations, Administration, Maintenance and Provisioning (OAM&P); Procedure flows for Type 1 interface HNB to HNB Management System (HMS)", (Release 9), Dec. 2009.
3rd Generation Partnership Project (3GPP), S3-090159, "pCR For Text on Device Validation in the Conclusion Section", Nokia Siemens Network, 3GPP TSG SA WG3 Security, SA#54, Firenze, Italy, Jan. 19-23, 2009, 3 pages.
3rd Generation Partnership Project (3GPP), TR 33.812, V0.0.2, "3rd Generation Partnership Project; Technical Specification Group Services and System Aspects; Feasibility Study on Remote Management of USIM Application on M2M Equipment; (Release 8)", Oct. 12, 2007, 14 pages.
3rd Generation Partnership Project (3GPP), TR 33.812, V1.2.0, "3rd Generation Partnership Project; Technical Specification Group Services and System Aspects; Feasibility Study on Remote Management of USIM Application on M2M Equipment; (Release 8)", Nov. 1, 2008, 61 pages.
3rd Generation Partnership Project (3GPP), TR 33.820 V1.3.0, 3rd Generation Partnership Project; Technical Specification Group Service and System Aspects; Security of H(e)NB; (Release 8), Jan. 2009, 75 pages.
3rd Generation Partnership Project (3GPP), TR 33.820, V1.2.0, "3rd Generation Partnership Project; Technical Specification Group Service and Systems Aspects; Security of H(e)NB"; (Release 8), Dec. 2008, 67 pages.
3rd Generation Partnership Project, "System Architecture of HNB (Release 8)", 3GPP TSG RAN WG3 Meeting, Sophia Antipolis, France, Jun. 11-12, 2008, 1 page.
3rd Generation Partnership Project: Technical Specification Group Service and System Aspects; Security of H(e)NB; (Release 8), 3GPP TR 33.820 V2.0.0, SP-090130.zip, URL, http://www.3gm2.org/ftg/tsgsa/TSGSA/TSGS43/docs/, Mar. 4, 2009.
Gallery and Mitchell, "Trusted Mobile Platforms", Foundations of Security Analysis and Design, IV; Lecture Notes in Computer Science, Springer Berlin Heidelberg, Berlin, Heidelberr, Aug. 18, 2007, pp. 282-323.
International Patent Application No. PCT/US2010/026436: International Search Report, dated Sep. 2, 2010, 18 pages.
Kaufman, "Internet Key Exchange (IKEv2) Protocol," Network Working Group, RFC-4306, Dec. 2005.
Pearson, al. et al Trusted Computing Platforms: TCPA Technology in Context By: Siani, Pub. Date: Jul. 22, 2002, Chapter 6, pp. 106-107.
Pearson, al. et al Trusted Computing Platforms: TCPA Technology in Context by: Siani, Pub. Date: Jul. 22, 2002, p. 39.
Pearson, al. et al Trusted Computing Platforms: TCPA Technology in Context by: Siani, Pub. Date: Jul. 22, 2002, Chapter 6, pp. 106-109.
Sailer et al, "Design and Implementation of a TCG-Based Integrity Measurement Architecture," Proceedings of the 13th USENIX Security Symposium, 2004.
Schmidt et al ., "Trust for Location-Based Authorization," IEEE Communication Society, 2008.
TCG, "TCG Specification Architecture Overview", Specification, Revision 1.4, Aug. 2, 2007, 54 pages.
Trusted Computing Platforms: Tcpa Technology in Context, Siani Pearson, et al., Jul. 22, 2002, Prentice Hall; pp. 40, 50, 52, 57, 59, 60, 111'143, 144, 153, 184, 209.
Trusted Computing Challenges. Amd Presentation, Leendert van Doom, Nov. 2007.
Trusted Computing Group et al, "TCG Specification Architecture Overview Passage", TCG Specification Architecture Overview, Trusted Computing Group, US, No. revision 1.2, Apr. 28, 2004.
Trusted Computing Group, "TCG Mobile Reference Architecture," Specification version 1.0, Revision 1 ,Jun. 2007.
Van Dijk et al, "Securing Shared Untrusted Storage by using TPM 1.2 Without Requiring a Trusted OS. Technical Report", MIT CSAIL CSG Technical Memo 498, May 2007.
Yoshihama, "Platform Trust Based Access Control Framework," The 2006 Symposium on Cryptography and Information Security, 3B2 Access Control, 3B2-5, SCIS 2006 Organizing Committee, Japan, Jan. 17, 2006.

\* cited by examiner

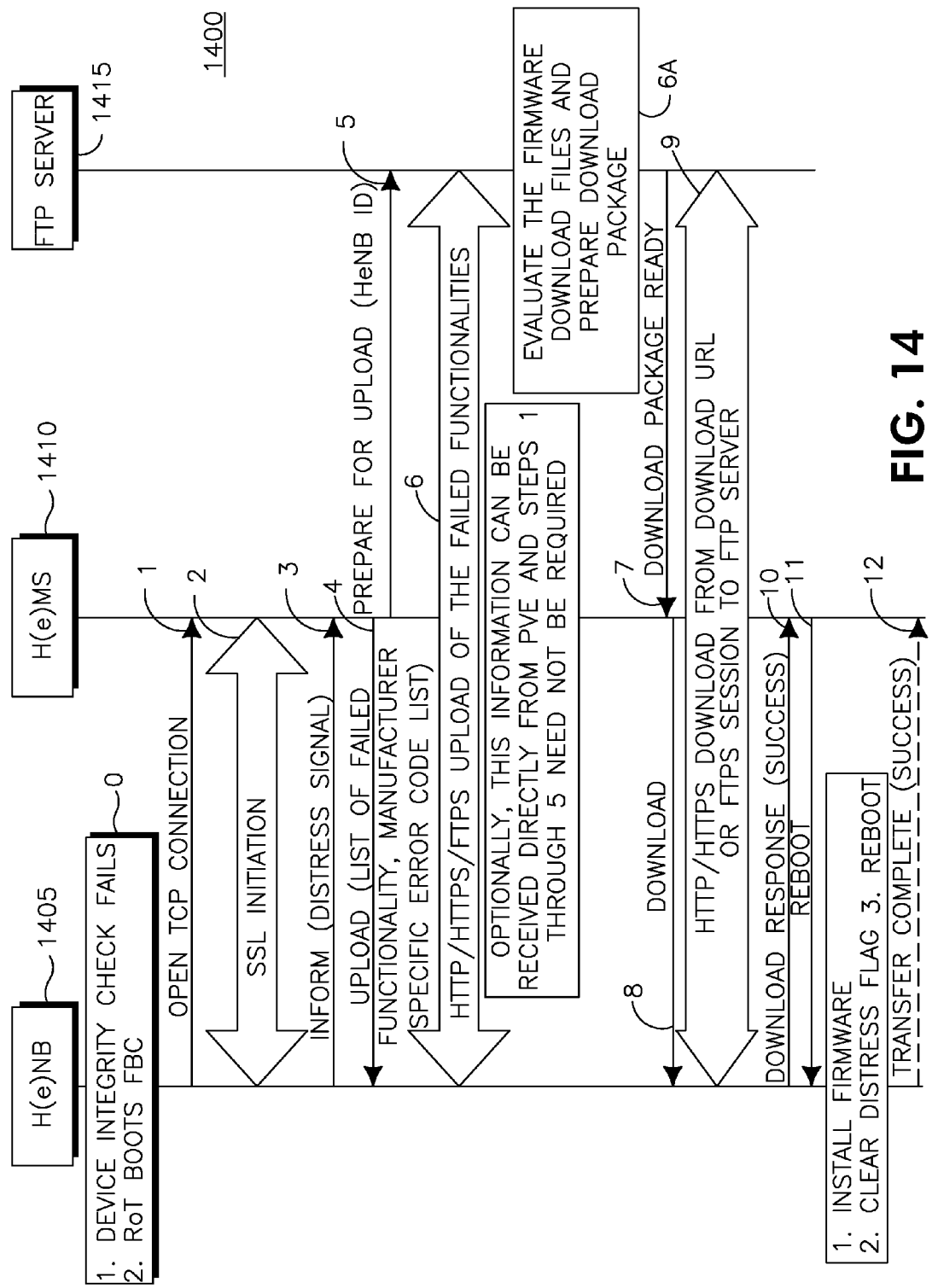

US 9,253,643 B2

METHOD AND APPARATUS FOR H(E)NB INTEGRITY VERIFICATION AND VALIDATION

CROSS REFERENCE TO RELATED APPLICATIONS

This application claims the benefit of U.S. provisional application No. 61/157,833 filed Mar. 5, 2009; U.S. provisional application No. 61/222,067 filed Jun. 30, 2009; U.S. provisional application No. 61/235,793 filed Aug. 21, 2009; and U.S. provisional application No. 61/239,698 filed Sep. 3, 2009, which are all incorporated by reference as if fully set forth herein. This application is related to U.S. patent application Ser. No. 12/718,480, filed concurrently, and entitled "Platform Validation and Management of Wireless Devices", which is incorporated by reference as if fully set forth herein.

FIELD OF INVENTION

This application is related to communications.

BACKGROUND

Home evolved node B (H(e)NB), known also as femtocells, are small, portable access points to 3G networks which are generally placed on the premises or in the homes of stakeholders called a Hosting Party (HP). The H(e)NB becomes a mediator for mobile communication and services in a small, designated geographic area. The H(e)NB may be used to provide mobile services in hitherto inaccessible areas (due to bad radio conditions) such as in-house or factory environments. It is also an option for private households and the small office home office (SOHO) sector as a H(e)NB may be a unified access point to broadband Internet and mobile networks.

This application may pose specific security requirements. For example, these devices are i) no longer considered as closed, immutable environments for the storage and handling of sensitive data, as mobile handsets have been traditionally viewed; and ii) these special devices are typically not under the direct physical control of the mobile network operator (MNO), who as the H(e)NB's main stakeholder operates the H(e)NB to provide services to the users of mobile communications terminals, and iii) these devices are in general are connected to the core network over an insecure link and in ways that may be intermittent rather than continuous.

Existing or standardized technology of mobile communication networks may not provide methods for the network to fully consider that the H(e)NB that it operates would be trustworthy even if the H(e)NB passes the traditional authentication steps. What is needed, then, is a method that helps the MNO to authenticate as well as validate the trustworthiness, i.e., the integrity, of devices and to manage and provision such devices.

SUMMARY

An apparatus and method for providing home evolved node-B (H(e)NB) integrity validation using autonomous validation and semi-autonomous validation is disclosed herein.

BRIEF DESCRIPTION OF THE DRAWINGS

A more detailed understanding may be had from the following description, given by way of example in conjunction with the accompanying drawings wherein:

FIG. 14 shows an example flowchart for SAV remediation;

DETAILED DESCRIPTION

Figure 1:
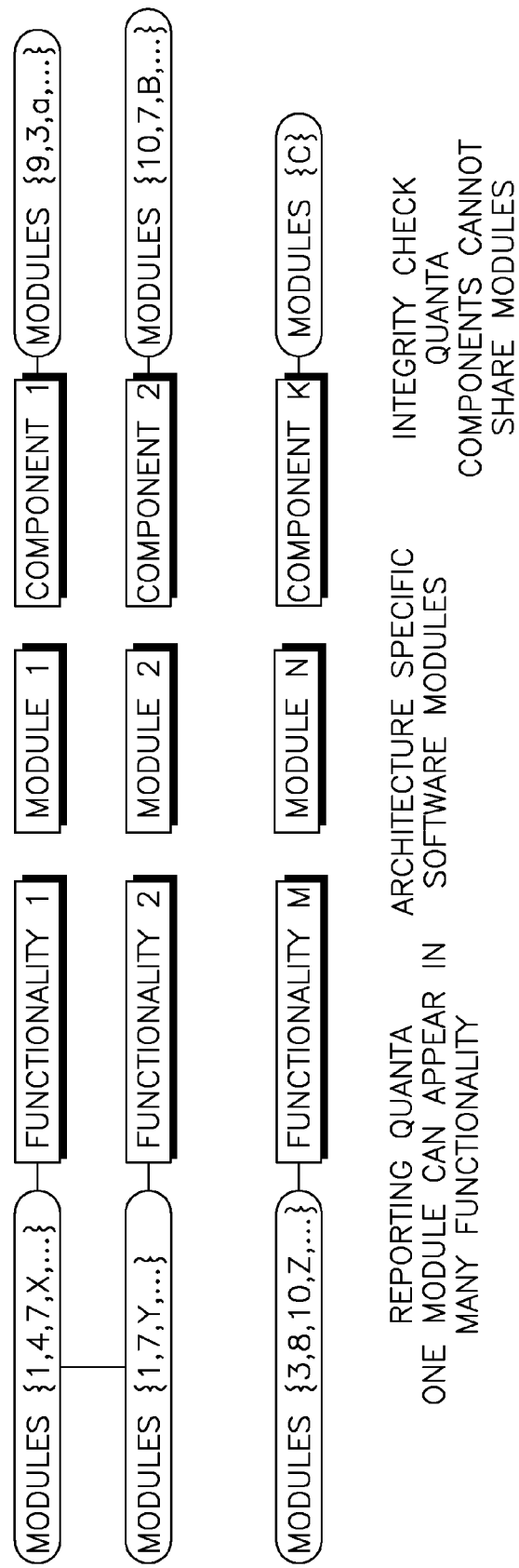
FIG. 1 shows an example organization of modules, functionality and components.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), a gateway, a customer premise equipment (CPE), or any other type of interfacing device capable of operating in a wireless or wireline environment. When referred to hereafter, the terminology "HMS" includes, but is not limited to, a Home NodeB Management System (HMS), Home Enhanced-NodeB Management System (HeMS), where the two may be collectively referred to as H(e)MS, a Device Management System (DMS), a Configuration Server (CS), an Auto Configuration Server (ACS), or any other type of system that manages configuration or functionality of a "base station". The terms "WTRU" and "base station" are not mutually exclusive. For example, a WTRU may be an enhanced Home Node-B (H(e)NB). When referred to hereafter, the term "information-theoretically secure" includes but is not limited to perfectly secure, unconditionally secure, and nearly information-theoretically secure. When referred to hereafter, the terms "trust", "trusted", and "trustworthy", as well as variations thereof, indicate a quantifiable and observable manner of assessing whether a unit will function in a particular manner.

Described herein is an apparatus and method for providing home evolved node-B (H(e)NB) integrity verification and validation using autonomous validation (AuV) and semi-autonomous validation (SAV). Described are details common to AuV and SAV, followed by implementation details with respect to AuV and SAV.

Methods for determining the Trusted Reference Values (TRV) used in the validation methods are described herein. Device integrity checking is a procedure that is common to validation methods. For device integrity checking, a set of TRVs are needed so that measurements made of components may be checked for their integrity. It may be desirable that such integrity checking of components should be done before components are loaded. It may also be desired that such TRVs may be authenticated and ensured of integrity by themselves before they are used.

In order to perform the integrity checks and provide and generate TRVs, different integrity check methods may be used. For example, methods for generating TRVs corresponding to a code may include digital signature methods, hash based message authentication codes or encryption based message authentication codes may be considered.

Described herein are digital signature methods. Digital signature methods may use public key cryptography. A H(e)NB may digitally sign the hash (or check-word, in general) of the module by encrypting the check-word using its private key. The encrypted check-word may then be sent to a platform validation entity (PVE) where it may be decrypted by the public key of the H(e)NB and compared to the TRVs. For local integrity checks, the reference integrity checks may be signed by the manufacturer and verified locally within the H(e)NB. As non-limiting examples, Table 1 identifies some digital signature methods.

TABLE 1

| Name | Type | Characteristics | Min Key Size |
|---|---|---|---|
| Digital Signature Standard | FIPS 186-2 digital signature | Digital signature based on SHA-1 hash. No patents, no licenses. US Federal Government export control applies | 1024 bits |
| RSA Digital Signature | RSA digital signature (FIPS approved) | Previously patented.(expired 2000) | 1024 bits |
| Elliptic Curve Digital Signature | Elliptic curve digital signature | Technology based on elliptic curve key technology. | 160 bits |

Described herein are hash algorithms and hash-based message authentication codes. Hashing is an one-way or nearly one-way function that produces unique (or nearly unique) and non-reversible (or nearly non-reversible) summary of its input. Digital signatures in many cases is nothing more than an encrypted hash. While digital signature methods may use public/private key pairs, message authentication codes (MACs) may use a shared secret key. A check-word may be created over the module with an embedded secret key (concatenated module and key). As non-limiting examples, Table 2 identifies some hash algorithms as well as hash-based message authentication code methods.

TABLE 2

| Name | Type | Characteristics | Min Key Size |
|---|---|---|---|
| SHA-1, SHA-256, SHA-512 | Hash algorithm | FIPS approved | 160, 256, 512 bits |
| Universal Message Authentication code | Hash based MAC | Fastest hash-based algorithm | 32, 64, 96 bits |
| RACE integrity Primitives Evaluation Message Digest —160 | Hash algorithm | EC's R&D in Europe | 160 bits |
| TIGER(2) | Hash algorithm | Designed for efficient operation on 64 bit platforms | 192 bits |
| HMAC-SHA1-96 | Hash based MAC | Uses SHA-1 for hash | 96 bits |
| WHIRLPOOL | Hash based MAC | Not Patented. | 512 bits |

Described herein are encryption based message authentication codes. A check-word may be created by a hash algorithm and then encrypted by using the secret key. As non-limiting examples, Table 3 identifies some encryption based message authentication code methods.

TABLE 3

| Name | Type | Characteristics | Min Key Size |
|---|---|---|---|
| DES-CBC-MAC | Cryptographic MAC | DES based | 64 bits |
| CMAC | Cryptographic MAC | Encryption based MAC using symmetric key block cipher algorithm | 64, 128, 192, 256 |
| CCM | Cryptographic MAC | Uses cipher block chaining with counter mode encryption | 128, 192, 256 |

Integrity metrics are the digests (e.g., cryptographic hash values) generated by the execution of the integrity methods on the software components. Components are considered herein as the smallest possible quanta of integrity checking. Individual binary executable or pre-executable files are examples of components. Modules, on the other hand, are considered herein as the smallest quanta whereby the manufacturer of the software packages, certifies, and delivers. For the remainder of this description, consider in general and as shown in FIG. 1, that 1) a component may always consist of one or more modules, and 2) any one module appears only once in a component (i.e., one module cannot appear in two components). For supporting device integrity checks and validation in AuV and SAV, the list of software modules and their associated attributes, such as the reference integrity metrics (RIM) that correspond to the module, severity, and other information may have to be provided. The reference integrity metric (RIM) serves as reference values for the integrity of individual module. In the case of AuV, the list may be generated by the manufacturer and stored securely in the device and in the case of SAV, the list may be generated by the manufacturer and provided to the platform validation entity (PVE) (all modules) and also provisioned to the H(e)NB (for stage 1 and stage 2 modules in a multi-stage start up implementation). Since how the software modules are organized, structured, or stored, as well as what kind of such modules may exist on the device may depend on the H(e)NB implementation, a common specification language may be used to specify the modules and their attributes.

For example, extensible mark-up language (XML) and Abstract Syntax Notation One (ASN.1) based methods may be used for implementing a common specification language. A device configuration data sheet contains the list of software modules and the various attributes associated with the modules. It may also specify the classification of modules into components and functionalities.

Described herein is a XML based specification of the software module attributes that may provide a common, portable language to specify the components and/or modules of H(e)NB and the associated attributes. In order to provide the information in a portable way and in an H(e)NB architecture-agnostic way, a language that specifies the modules has to be evolved. The language can be similar to the XML language which contains an XML schema and XML documents. The format and the various attributes of a module may be standardized and every manufacturer provides a device configuration data sheet describing the software modules in the prescribed format. The format may be similar to XML schema and the device configuration data sheet may be similar to a XML document. An XML signature provides support for adding digital signatures to provide integrity, message authentication and/or signer authentication. A binary XML is a more compact representation and may also be used as a basis to reduce the parsing costs as well as to reduce the required bandwidth for communication of the configuration data from one entity to another. An example of an XML-Schema is shown in Table 4 and may be a standard format in which manufacturers may specify their modules.

TABLE 4

XML-Schema

```
<?xml version="1.0"?>
<xs:schema xmlns:xs="http://www.w3.org/2001/XMLSchema">
<xs:element name="Manufacturer Identification">
  <xs:complexType>
```

TABLE 4-continued

XML-Schema

```
    <xs:sequence>
      <xs:element name="Name" type="xs:string"/>
      <xs:element name="URL" type="xs:string"/>
    </xs:sequence>
  </xs:complexType>
</xs:element>
<xs:element name="Module Name">
  <xs:complexType>
    <xs:sequence>
      <xs:element name="Version" type="xs:string"/>
      <xs:element name="Stage" type="xs:string"/>
      <xs:element name="Severity" type="xs:string"/>
      <xs:element name="Author" type="xs:string"/>
      <xs:element name="Dependency" type="xs:string"/>
      <xs:element name="Integrity Algorithm" type="xs:string"/>
      <xs:element name="Reference Integrity Metric" type="xs:string"/>
    </xs:sequence>
  </xs:complexType>
</xs:element>+
<Signature ID?>
  <SignedInfo>
    <CanonicalizationMethod/>
    <SignatureMethod/>
    (<Reference URI? >
      (<Transforms>)?
      <DigestMethod>
      <DigestValue>
    </Reference>)+
  </SignedInfo>
  <SignatureValue>
  (<KeyInfo>)?
  (<Object ID?>)*
</Signature>
</xs:schema>
``` where "?" denotes zero or one occurrence; "+" denotes one or more occurrences; and "*" denotes zero or more occurrences A manufacturer may provide a device configuration data sheet and sign it with the digital signature. This device configuration data sheet may be maintained at the H(e)NB for AuV. In the case of a failed check, appropriate actions may be taken if the digital signature of the device configuration sheet itself is verified, since this would mean that the attribute of the software, which includes information on the impact of any failed module, is intact even though the software module itself (i.e., the binary image) may have changed and have failed integrity checking. In the case of SAV, the device configuration sheet may be maintained at the device and PVE. Additional actions may be added to support SAV as described herein.

Described herein is an ASN.1 based specification of the software module attributes that may provide a common, portable language to specify the components of H(e)NB and the associated attributes. In telecommunications and computer networking, ASN.1 is a standard and flexible notation that describes data structures for representing, encoding, transmitting, and decoding data. It may provide a set of formal rules for describing the structure of objects that are independent of machine-specific encoding techniques and is a precise, formal notation that removes ambiguities. As commonly used for defining messages for communication protocols, ASN.1, with its associated encoding rules, results in a binary encoding. Other communication protocols, such as Internet protocols HTTP and SMTP, define messages using text tags and values, sometimes based on the Augmented Backus-Naur form (ABNF) notation. The definition also defines the encoding, which is in text.

The ASN.1 approach is believed to be more efficient, and with Packed Encoding Rules, certainly provides a more compact encoding. The textual approach is claimed to be easier to implement (through creation and parsing of text strings) and easier to debug, as one can simply read an encoded message. In the case of the Megaco protocol, two encodings were defined based on ASN.1 and ABNF.

The ASN.1 XML Encoding Rules (XER) provide a textual encoding of data structures defined using ASN.1 notation. Generic String Encoding Rules were also defined for the sole purpose of presenting and inputting data to/from a user. An example of ASN.1 for communicating device integrity metrics may be shown in Table 5.

TABLE 5

ASN.1

```
DeviceIntegrityMeasurementsType DEFINITIONS ::= BEGIN
    ManufacturerIdentification ::= {
        Name            IA5String,
        URL             IA5String
    }
    Modules ::= SEQUENCE {
        Version         INTEGER,
        Stage           INTEGER,
        Severity        INTEGER,
        Author          IA5String,
        Dependency      IA5String,
        IntegrityAlgo   IA5String,
        RIM             IA5String
    }
    DigitalSignature ::= {
        SignedInfo      SignedInfoType,
        KeyInfo         KeyInfoType,
        SignatureValue  IA5String
    }
END
```

The types SignedInfoType and KeyInfoType may be defined in a similar fashion as DeviceIntegrityMeasurementsType.

If for each software module on the device, its associated module attributes are known to the network, then during the SAV procedure the H(e)NB may send to the PVE just the list of the identifications (ID's) of all modules that have failed an integrity check during the local integrity check procedure. The network, by way of the PVE, would know the relevant attributes of the particular software modules and the impact of their failures. This information may be used to make an assessment of the next step the network takes as described herein.

Described herein are software module attributes that may be considered as being transmitted to the H(e)NB and may be provisioned as a digital certificate or signed message from a trusted third party (TTP) such as the H(e)NB management system (H(e)MS). For example, overall information elements for the code image may include, but is not limited to, the manufacturer of the H(e)NB and an integrity method that may be used to generate the digest or RIMs of the module code image.

Described herein are methods to describe component specific information. One or more components constitute a software module. A component is a basic quanta of integrity checking. There is one trusted reference value (TRV) associated with each component. Component specific information elements may include a component ID that is an uniquely identifiable ID corresponding to the component description. This is the ID of the quanta of code to be checked with one TRV. It may further include TRVs that the integrity checking mechanism on the H(e)NB may use to compare the measurements of the component to verify the integrity of the component.

Module specific information elements may include, but is not limited to, a module description that describes a specific module function within a H(e)NB and a module ID that identifies the module uniquely for the manufacturer. It may also include a function description that identifies the specific functionality of a H(e)NB to which this module is mapped and a function ID that may be a globally identifiable ID, standardized across vendors and corresponding to the function description. It may further include a component ID that identifies the component to which this module maps to and a release version that indicates the version number of the module. In the case where there is a one-to-one mapping between a component and a module, module specific information could effectively be identical to component specific information.

The module specific information elements may also include a severity classification that specifies the impact of the failure of the integrity check of the current software on the system's functionality. For example, there may be a multiple level severity classification system. For example, severity 1 may be a failure of the module/function that results in high impact on the H(e)NB functionality and may warrant halting operation of the system. Failure of the module/function may result in a limp along system based on a fallback code image (FBC). In this case, communication with a network based device management system (which would be the H(e)MS if the device is a H(e)NB) may be possible. The FBC may be able to send a distress signal to a designated H(e)MS. Furthermore, it may also support a network-initiated firmware/software update. For example, any module or component for the trusted environment (TrE) of the H(e)NB may have severity 1. Severity 2 may be a failure of the module/function that may result in a limited H(e)NB functionality, which may partly function or support a subset of the full H(e)NB functionality. In this case, communication with a security gateway (SeGW) may be possible. Severity 3 may be a failure of the module/function that may not affect the system's core functionality but may still be considered important enough to require early remediation in the case of failure. The failed module/function may be replaced via an immediate firmware/software update procedure and validated through a subsequent reboot. Severity 4 may be a failure of the module that may not affect the system's core functionality. The failed module(s) may be replaced via a normal firmware/software update schedule.

Described herein are reporting procedures or methods for validation methods. For AuV, all procedures of the device integrity checks may be performed locally. If the integrity check fails, a distress signal may be sent to the H(e)MS to indicate the failure. Subsequent actions may range from sending personnel to fix the issue or quarantine the device. Remediation may be performed, in which case the list of failed modules may be reported to the remediation server/H(e)MS. In the case of SAV, a list of the functionalities that have failed integrity checks may be reported to the PVE.

The modules depend on the manufacturer's implementation. A set of compiled software modules may form an object image. Integrity checks may be performed on object image chunks. Therefore, components have been introduced which combine a set of modules on which integrity checks are made. One module appears once in a component and appears in only one component (i.e., one module cannot appear in two components). This way, when integrity checks are performed, a module is checked only once. The manufacturer of the H(e)NB (which may be either identical or different from the manufacturer of any individual software module) decides how to partition modules into components for device integrity checks based on the architecture.

Functionality may be based on the requirements and functional architecture of the H(e)NB, and may be a standardized identifier. For example, the Iu interface and mobility management are functions. A module may be shared between the two functions. Therefore, when a component (which is a integrity check quanta) fails the integrity check, then the affected modules are known. Since each module has a functionality associated with it, a list of failed functionality may be derived. This list of failed functionality is sent to the PVE in SAV.

Described herein is a functionality ID. The implementation of the architecture governs the number and type of software modules. In order to harmonize the reporting structure and methodology over multiple manufactures and/or stakeholders (such as the mobile network operator), reporting may be done based on the functionality instead of the actual modules. The software modules may be grouped based on their functionality. The functionality ID provides the means to categorize the modules based on the functionality description. Table 6 lists some of the functionality that has been derived based on what is currently known. This list may be expanded and standardized. In Table 6, the numbers from 1-9 for the last significant digit are reserved for future use or expandability.

TABLE 6

| Functionality ID | Functionality Description |
| --- | --- |
| 10 | H(e)MS subsystemSecure boot loader |
| 20 | Uu interfaceTrE |
| 30 | Iuh interfaceIntegrity Validation Engine |
| 40 | HGm InterfaceFall Back Code |
| 50 | HUt InterfaceOperating System |
| 60 | S1-MME interfaceH(e)MS subsystem |
| 70 | S1-UUu interface |
| 80 | I2 (SIP)Iuh interface |
| 90 | Iu-CS interfaceHGm Interface |
| 100 | Iu-PS interfaceHUt Interface |
| 110 | E, Nc, NbS1-MME interface |
| 120 | RUA servicesS1-U interface |
| 130 | HNBAP servicesI2 (SIP) interface |
| 140 | HNB GW DiscoveryIu-CS interface |
| 150 | HNB RegistrationIu-PS interface |
| 160 | WTRU Registration for HNBE, Nc, Nb interface |
| 170 | Access control managementRUA services |
| 180 | Time ManagementHNBAP services |
| 190 | CSG managementHNB GW Discovery |
| 200 | Mobility ManagementHNB Registration |
| 210 | NAS Node selection functionUE Registration for HNB |
| 220 | Paging OptimizationAccess control management |
| 230 | Transport Address MappingTime Management |
| 240 | ChargingCSG management |
| 250 | Emergency ServicesMobility Management |
| 260 | QoS ManagementNAS Node selection function |
| 270 | Local IP AccessPaging Optimization |
| 280 | Managed Remote AccessTransport Address Mapping |
| 290 | HNB support for legacy CNCharging |
| 300 | Inbound Handover SupportEmergency Services |
| 310 | RoamingQoS Management |
| 320 | SCCP connectionless comm to MSC SGSNLocal IP Access |
| 330 | OAM subsystemManaged Remote Access |
| 340 | Display subsystemHNB support for legacy CN |
| 350 | USIM subsystemInbound Handover Support |
| 360 | HPM subsystemRoaming |
| 370 | IMS interworkingSCCP connectionless comm to MSC SGSN |
| 380 | IP-PABX interfaceOAM subsystem |
| 390 | Security FunctionsDisplay subsystem |
| 400 | RAB managementUSIM subsystem |
| 410 | Radio Resource ManagementHPM subsystem |
| 420 | Iu Link ManagementIMS interworking |
| 430 | Iu U-plane (RNL) ManagementIP-PABX interface |
| 440 | Iu-CoordinationSecurity Functions |
| 450 | Provisioning FunctionsRAB management |

TABLE 6-continued

| Functionality ID | Functionality Description |
| --- | --- |
| 460 | Hardware FailureRadio Resource Management |
| 470 | Iu Link Management |
| 480 | Iu U-plane (RNL) Management |
| 490 | Iu-Coordination Functions |
| 500 | Provisioning Functions |
| 510 | Hardware Failure |

Described herein is a component ID. In order to harmonize the device integrity checks, the modules may be categorized based on the generated image. A set of object files may be archived together in an image file. Such a group of modules contain the same component ID and are collectively checked for integrity and therefore, have one trusted reference value (TRV) for one component. Since each software module comes with its own reference integrity metric (RIM), a trusted reference value (TRV) of a component may be obtained as a digest (e.g., a hash) of a concatenation of one or more software modules, each of which may have a RIM associated with it. Note that the modules appearing in one component ID may be mapped to a different functionality ID than the same module appearing in another component ID. This procedure provides flexibility to the manufacturers based on their architecture and compilers, for example, enabling grouping of modules either based on the object images or the stages of the SAV integrity checks.

A module ID is used to track the various modules of the software and may not be standardized, although it is not impossible to standardize either. If the module ID is not standardized, it may be left up to the manufacturer to decide which and how many modules are present. A module ID may be used for providing, tracking and constructing the firmware/software update package.

Described herein are methods and structures for organizing and stating the relationship between the various identifiers such as the modules, components and functionality. FIG. 1 shows one example method and structure. Software architecture defines the number and type of modules. These modules are categorized based on their functionality and integrity check quanta. A component that consists of multiple modules has its own TRV. If integrity checking of any component, using its TRV, fails, then either the component itself is altered or its digest is no longer the same as the value of the TRV or the TRV corresponding to the component has been altered. In either case, upon a failed integrity check, the mapping between the modules and the component that failed the integrity checking as well as the mapping between the modules and functionalities, may be used to determine the list of the failed (or at least 'affected') functionalities. The list of identifiers of the affected functionality may be communicated to the H(e)MS or PVE.

Figure 2:
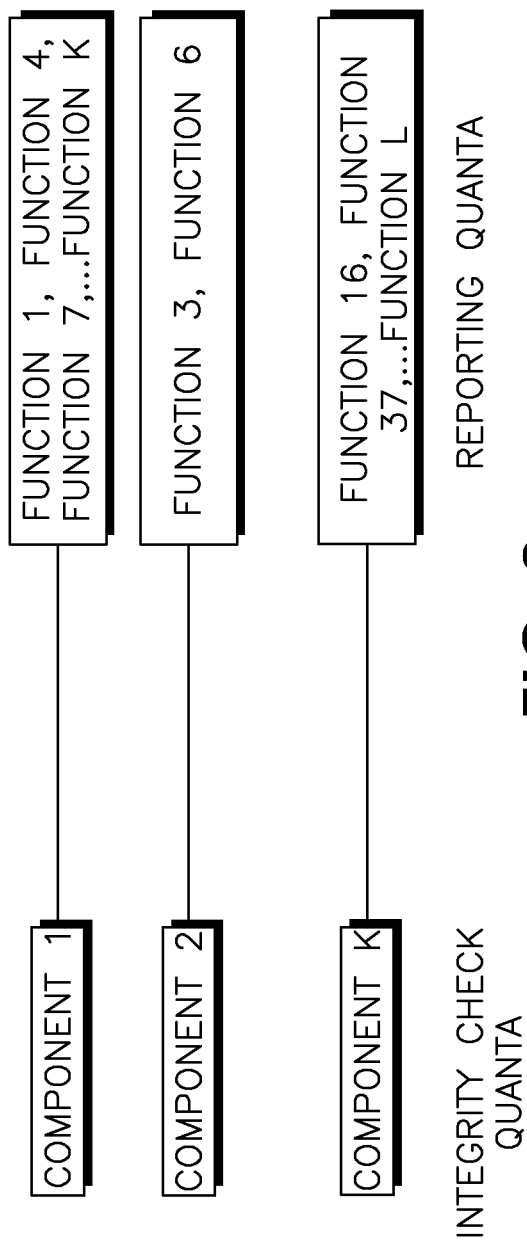
FIG. 2 shows an example organization of components and functionality.

FIG. 2 shows an example structure of components and functionality. As illustrated, when the components are the quanta on which the integrity checks are performed, the components may be decided by the manufacturers. To each component, a list of functionalities may be associated. The components are based on the functionality. Therefore, when a component fails the integrity check, the list of failed functionality may be constructed. The components may be organized in the order of their loading order, or, alternatively in the order of execution order. Therefore, if component 1 fails the check, then the functionality of component 2 that uses functions from component 1 for either loading or execution may also fail.

Another alternative implementation to extract the list of failed functionalities based on the failed integrity checks may be to perform the integrity checks on chunks of the image object file. If a certain block of image, specified by the start address and the end address in the object image, does not pass the integrity checks, then the names of the software functions corresponding to the failed segment are extracted. Based on the implemented functions, the list of failed H(e)NB functionalities may be derived. This may be done because the software functions belong to a module which implements certain H(e)NB functionality. For example, in a UNIX environment 'nm' provides the functionality to extract the names of a function in an object file. This information is extracted from the symbol table of the object.

Described herein is downloading and provisioning of software and TRV for validation methods. Three protocols that may be used are the TR069 based architecture, Open Mobile Alliance (OMA) Device Management (DM) based architecture and the Trusted Computing Group (TCG) Infrastructure Workgroup (IWG) based architecture. Additionally these protocols may also be used to configure the H(e)NB by utilizing the provisioning support. Other protocols than these three may also be considered.

Figure 3:
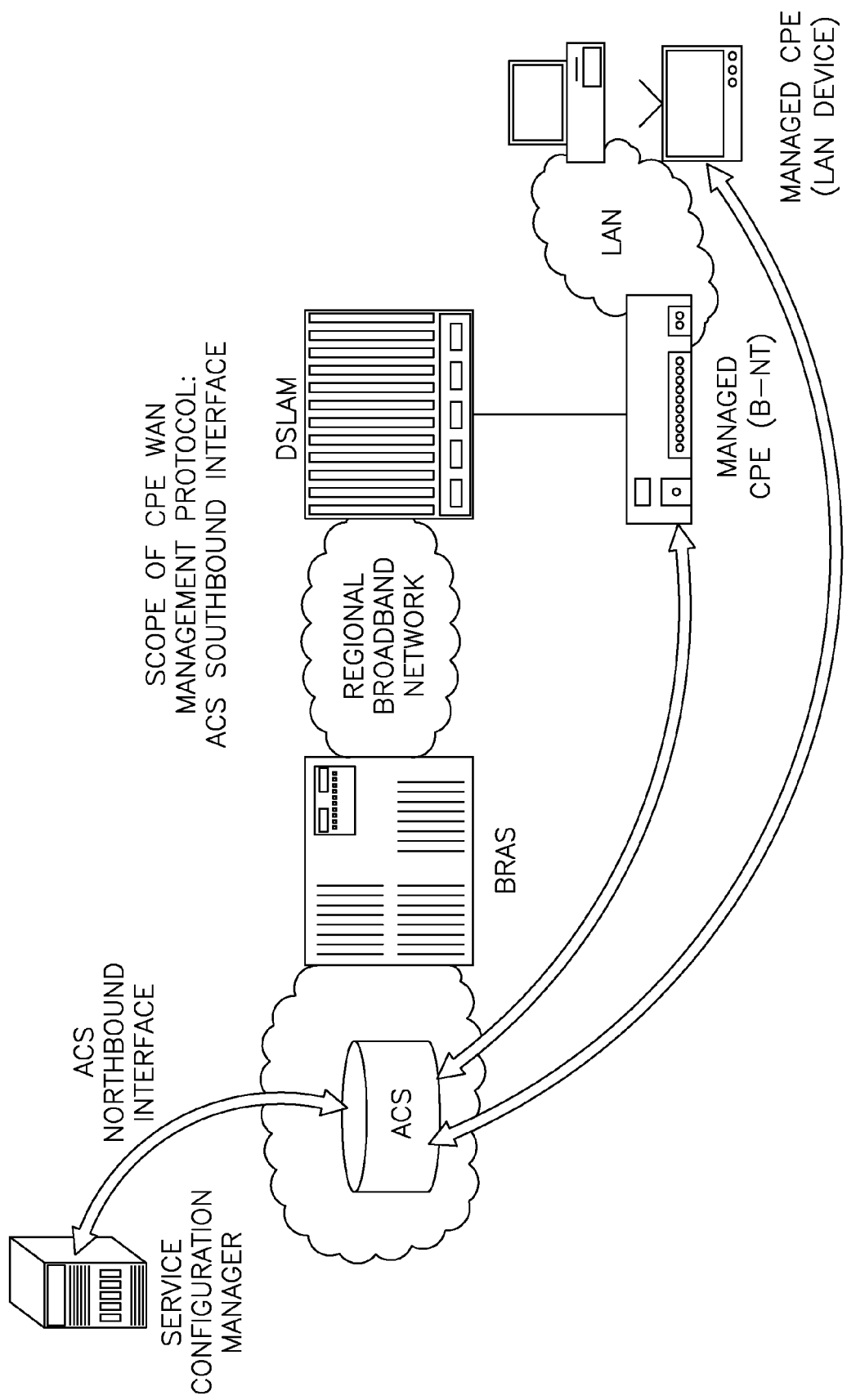
FIG. 3 shows an example TR069 architecture for software downloading provisioning.

The TR069 based architecture in FIG. 3 describes the customer premises equipment (CPE) wide area network (WAN) Management Protocol, intended for communication between a CPE and Auto-Configuration Server (ACS). The CPE maps to H(e)NB and ACS maps to the H(e)MS/remediation server/operations, administration and management (OAM). The CPE WAN Management Protocol may provide tools to manage downloading of CPE software/firmware image files. The protocol may provide mechanisms for version identification, file download initiation (ACS initiated downloads and optional CPE initiated downloads), and notification of the ACS of the success or failure of a file download.

The CPE WAN Management Protocol may also define a digitally signed file format that may optionally be used to download either individual files or a package of files along with explicit installation instructions for the CPE to perform. This signed package format ensures the integrity of downloaded files and the associated installation instructions, allowing authentication of a file source that may be a party other than the ACS operator. The integrity checking of downloaded files may be based on comparing the integrity digests (e.g., hashes) computed from individual modules contained in the downloaded files to their corresponding RIM values.

The CPE WAN Management Protocol may be useful to download the TRVs needed for device integrity checking to the H(e)NB. Such content may be digitally signed by the network operator's signing key. Upon receipt of the signed packet, the H(e)NB may then decrypt the signature and verify the authenticity and integrity of the received TRVs. In cases where a component is constructed as an ordered concatenation of several modules, the TRV may be constructed as an ordered concatenation of the RIMs corresponding to the modules.

The TRVs may also be encrypted for confidentiality before digitally signed. They may also be appended to the whole or (the first or the last) part of the software module binary image for which the TRV is created, within the same digitally signed packet.

Described herein are additional procedures for handling a H(e)NB device. These additional requirements and procedures may use an interface identified as a H(e)NB-H(e)MS interface in the description below. Validation of the H(e)NB may need additional protocol component requirements. The H(e)NB-H(e)MS should support secure sockets layer/transport layer security (SSL/TLS) and use a certificate based authentication between the H(e)NB and H(e)MS. This certificate may be the same certificate used for authentication to the SeGW. If a TR069 based architecture is used for the H(e)NB-H(e)MS interface, then the basic or digest authentication for CPE authentication may need to be adapted to support certificate based authentication.

Described herein are procedures or structure that may be needed for H(e)MS discovery based on TR069 architecture. The H(e)NB should be configured with a default H(e)MS uniform resource locator (URL) in the ManagementServer.URL parameter. This initial configuration may be done by the operator while distributing the H(e)NB or by the manufacturer. The H(e)NB may support local area network (LAN)-side ManagementServer.URL configuration by an authorized administrator. The H(e)MS URL may be a hypertext transfer protocol secure (HTTPS) URL. The hosting party dynamic host configuration protocol (DHCP) based H(e)MS URL update procedure may not be supported. If the value is updated locally, then the H(e)NB may contact the new H(e)MS to bootstrap the configuration files and to establish affinity. Should the URL be a name or an internet protocol (IP) address, it may require domain name system (DNS) resolution. DNS resolution of names may return multiple IP addresses, in which case either it is ensured that multiple IP may not be returned or if multiple IPs are returned then the H(e)NB picks out one randomly.

Described herein is SeGW discovery based on TR069 architecture. Similar to the H(e)S URL, the SeGW URL may be added as a parameter (SecureGateway.URL). This URL may be configured by an operator based on the location of the H(e)NB. An update of this parameter by the DHCP may not be supported. Local updates by authorized administrator may be performed.

Additional mechanisms to adapt device management protocols such as the TR069, OMA DM, or TCG IWG, for the purpose of AuV and SAV are described herein below.

Described herein is the OMA DM based architecture for downloading and provisioning software and TRVs for validation methods. OMA DM is a device management protocol jointly specified by the OMA DM Working Group and the Data Synchronization (DS) Working Group. Although OMD DM was developed for small foot-print mobile equipments such as phones, PDAs, and other similar devices, it lacks support for broadband wireline connectivity between the equipment and DM server and only supports short-haul wired connectivity (e.g., universal serial bus (USB), or RS232C) or wireless connectivity (global system for mobile communications (GSM), code division multiple access (CDMA), wireless local area network (WLAN), and other wireless communication systems), it may be useful as a device provisioning and management protocol for the H(e)NBs. This may be true for H(e)NBs that may present itself as a wireless transmit receive unit (WTRU) to the core network while presenting itself as a base station to the common serial gateway (CSG) and non-CSG WTRUs that connect to it.

The OMA DM may support use cases such as provisioning (including first-time device configuration and enabling/disabling features), device configuration updates, software upgrades, and diagnostics reporting and queries. The OMA DM server side may support all of these functions, although the device may optionally implement all or a subset of these features.

The OMA specification may be optimized to support the above-listed features for small foot-print devices with constrained connectivity. It may also support integrated security, using authentication (by use of such protocols as extensible authentication protocol-authentication and key agreement (EAP-AKA)) protocols made as part of the specifications.

The OMA DM may use XML (or, more accurately, a subset from SyncML), for data exchange. This may be useful for providing a standardize-able yet flexible way to define and convey attributes for software modules or functionality for the H(e)NB, for the purpose of validation.

Device management takes place between a DM server (the managing entity for the devices) and the client (the device being managed). The OMA DM supports transport layers such as wireless application protocol (WAP), HTTP, or object exchange (OBEX) or similar transports.

DM communication is asynchronously initiated by the DM server, using any available methods such as WAP, Push or short message service (SMS), using either a notification or an alert message. Once communication may be set up between the server and the client, a sequence of messages may be exchanged to complete a given DM task.

The OMA DM communication may be based on a request-response protocol, where requests may be made by only the DM server, and the client may respond with a reply message. The server and the client are both stateful, meaning any data exchanged due to a specific sequence may only occur after the built-in authentication procedure.

Since DM communication may only be initiated by the DM server, implementing SAV over DM may require a server-query-based approach to validation, possibly (immediately) following a device authentication procedure using internet key exchange (IKE)v2 (which is initiated by the device). Several different message types may be considered as a conveyor of the validation data (e.g., a list of failed software modules or device functionality). For example, the Management Alert message may be sent from the device to the server. Alternatively, the user of the Generic Alert message, that may be sent from the device to the DM server after there was a transmission of at least one Management Alert message from either the device or the server, may also be considered. Since all messages including these Alert messages use synchronization markup language (SyncML) format which provides flexibility in specifying the contents and meta data for the contents, it may be useful for validation information transmittal. The DM may support segmented data transfer, which may be useful for software update where the size of the update may be large. Segmented data transfer may also be used for transfer of the list of failed functionalities of the H(e)NB from the H(e)NB to the PVE in cases where the size of such information is large enough to require partitioning into multiple messages.

Described herein is the TCG IWG based architecture for downloading and provisioning software and TRVs for validation methods. Trusted Computing Group (TCG), Infrastructure Working Group (IWG) has specified detailed formats and protocols for platform integrity management. In the basic model for integrity measurement and reporting, network and service access may be conditioned on a platform's verified state.

TCG IWG standards provide a superset of the structure required for H(e)NB SAV or AuV. None of the IWG specifications may be used off-the-shelf. Furthermore, profiling the IWG specification to a specific use case of device validation may require XML Schema modifications (e.g., omission of required elements), which means deviating from IWG standards.

Figure 4:
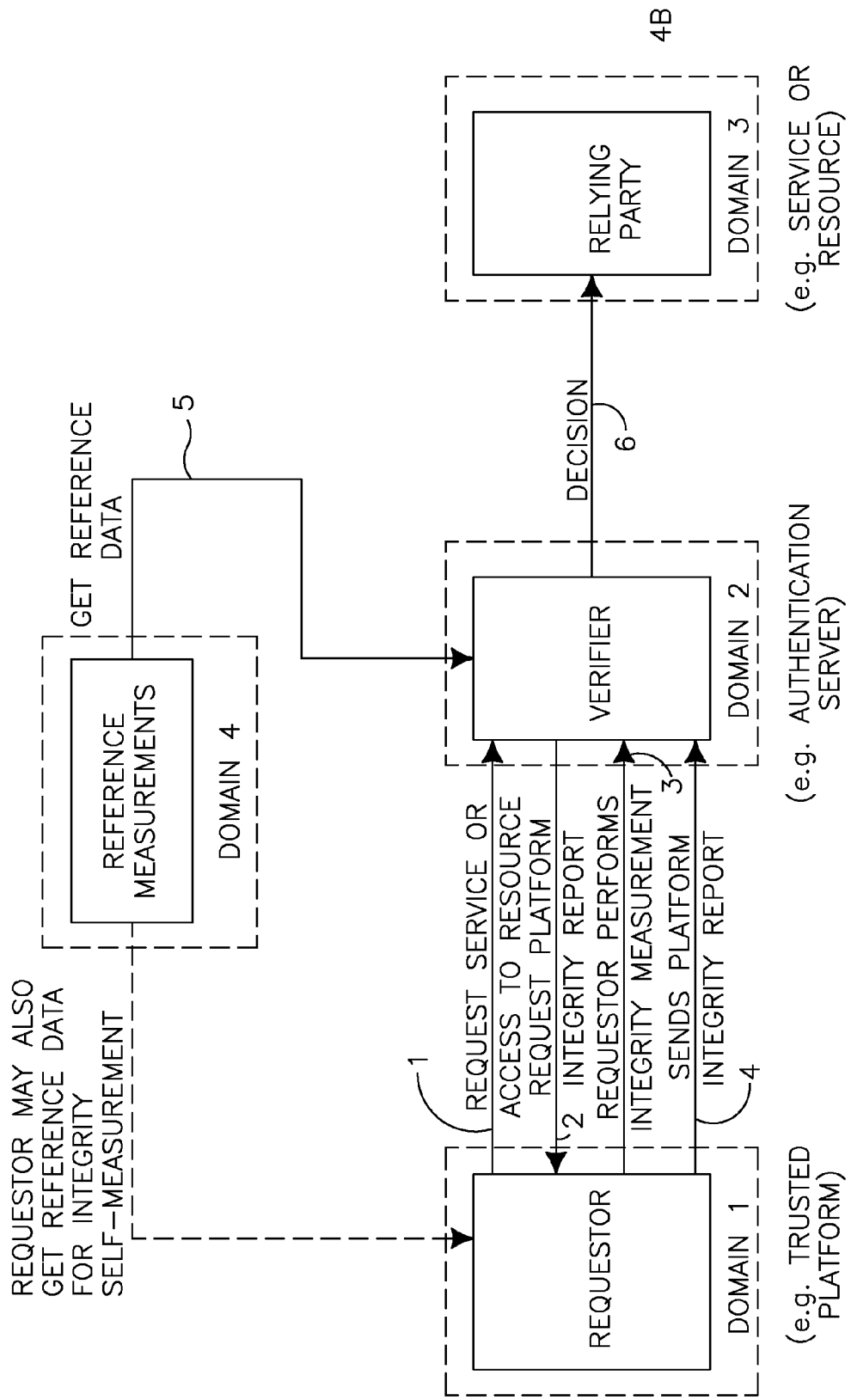
FIG. 4 shows an example of basic integrity measurement and reporting.

The basic interaction between a requesting platform and a network-side verifier is shown in FIG. 4. The verifier needs to seek authoritative information regarding each of the components of the requestor's platform (in the fifth step). That is, it requires reference measurements, for platform validation which is made available by the metric provider. Examples of the metric provider are the hardware manufacturer, software vendor or a trusted provider on behalf of the manufacturer and vendor. Once the verifier is able to identify each component of the requestor's platform and compare the reported measurement against the expected (baseline) reference measurement value (for that component), the verifier can gauge the level of trust of the requestor's platform. At this stage, the verifier is able to make a decision with respect to the requestor's wish to access resource/services at the relying arty. This is shown in the sixth step.

It may be noted that the IWG integrity verification architecture is largely independent of the presence of a hardware Trusted Platform Module (TPM) on the verified platform. In particular the data formats specified in the standards are capable of expressing generic component and platform security related attributes.

In order to support technical trust in a given component, the component manufacturer may support its product with information regarding the provenance of the component. That is, the manufacturer or a trusted third party must provide some static reference values for that component. These static reference/metric values for components are called reference measurements, and are represented in the form of the TCG Reference Manifest (RM) structure. The manifest for a component contains information such as its identity, manufacturer, model number, version number, and others. For the purpose of this application, the trusted reference values (TRVs) of the components of a H(e)NB may be specified by the TCG IWG Reference Manifest (RM) structure.

Figure 5:
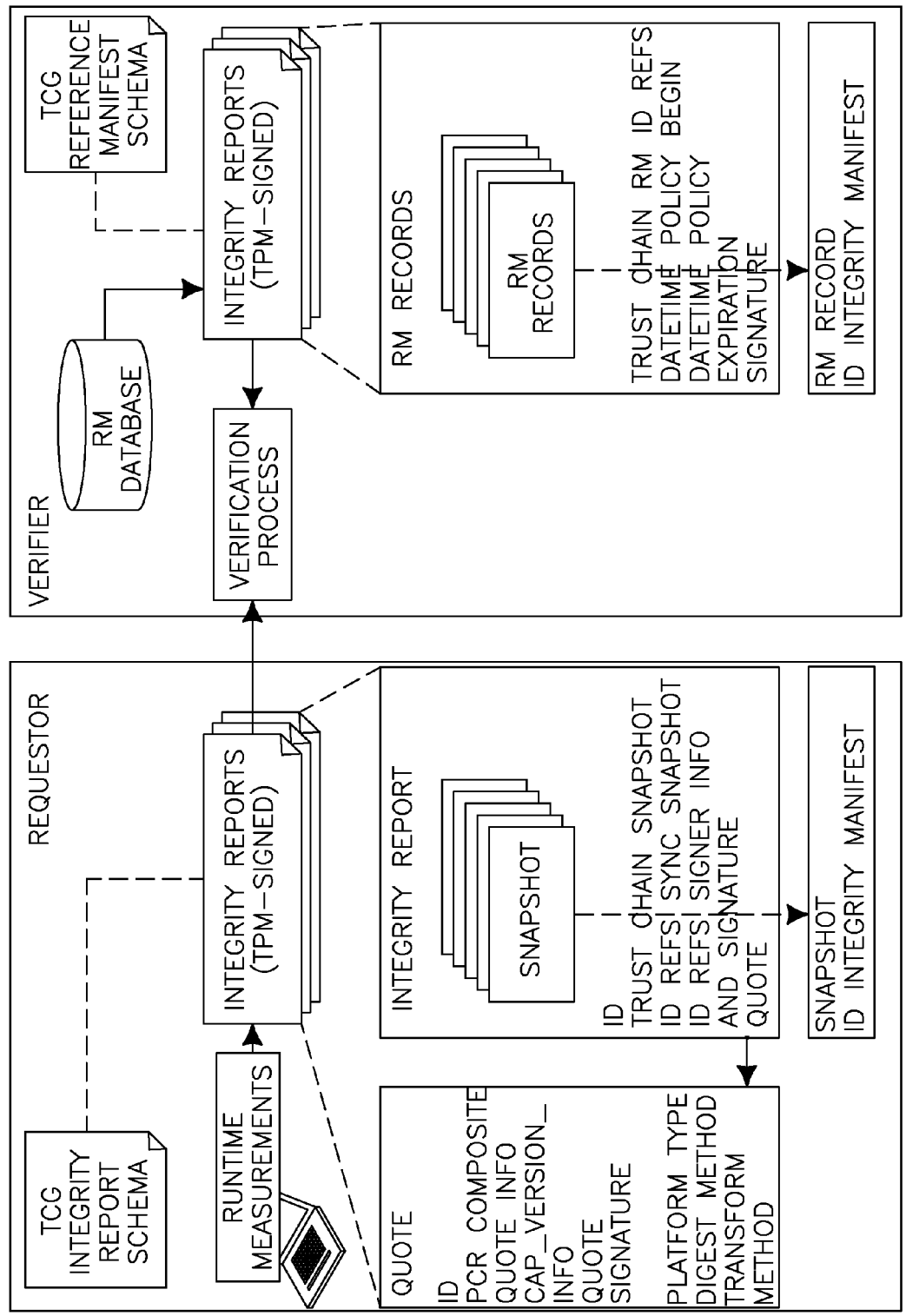
FIG. 5 shows an example of integrity reports and reference materials.
Figure 6:
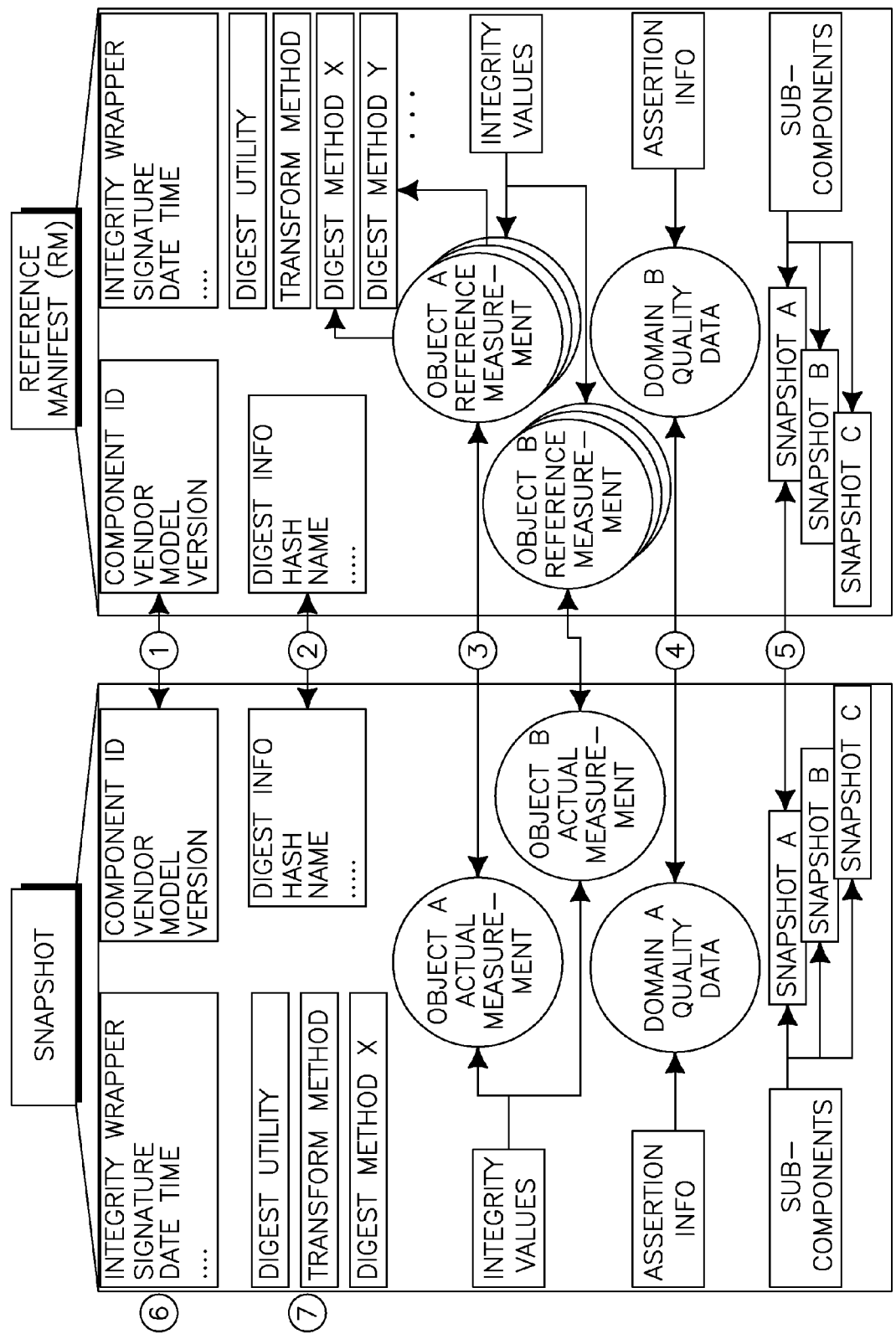
FIG. 6 shows an example of comparison of validation reports with reference manifests.

When a platform needs to be validated, it must provide the validator (such as the Platform Verification Entity—PVE) with an integrity report which is compiled from a set of snapshots covering the platform's components as shown in FIG. 5. The snapshot represents both the measurements and assertions about every relevant component of the platform (and possibly sub-components of these components). References (ID Refs) are used to point to information pertaining to the components reported in the integrity report as shown in FIG. 6.

The core elements for validation based on RMs are described in the TCG standard. For flexibility, XML namespaces may be used for platform-specific profiles of IWG formats, for instance mobile, or PC-Client.

An interoperable integrity log structure may address some platform specific constraints by defining a "hardware architecture" type value to indicate platform specific encodings. Type values may be defined in terms of TCG namespaces using an interoperable namespace mechanism such as XML-Namespaces and XRI.

Figure 7:
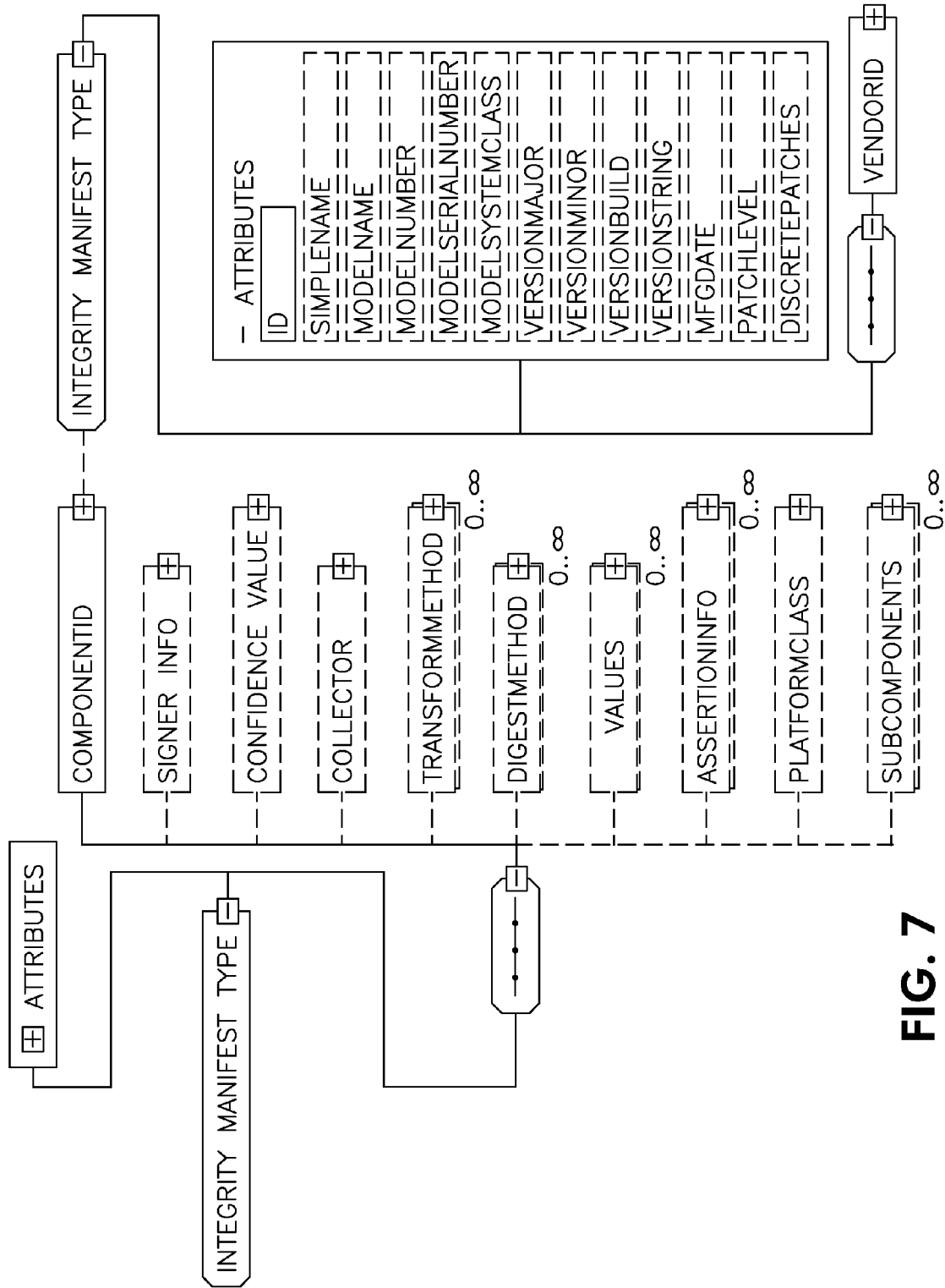
FIG. 7 shows an example of component information in a reference manifest.

The RM schema which inherits by extension from the core schema, defines the structure to hold references. The RM schema may roughly be understood as consisting of two sets of information as shown in FIG. 7. The first pertains to the information about individual components, and covers attributes such as the component model, name, version, serial-number, and so on. This information is captured in the ComponentIDtype structure. Surrounding this component-specific information is the metadata that pertains to the capturing (harvesting) of the component information. This is represented by the IntegrityManifestType structure in the schema. The metadata captured includes the collector (harvester) method used, the RM signature (and associated signer/issuer information), digest value(s) over the component (for software), confidence levels, assertions made and others.

Described herein are items specific to AuV. In AuV, the integrity check may be performed locally. Therefore, any of the digital signatures or message authentication codes described herein may be used. These may be signed by the manufacturer using the manufacturer's private key/shared secret and verified locally for their authenticity using the manufacturers shared secret or public key and may be used for verifying the integrity of the code locally.

However, in AuV, the device validation may be performed locally within the device, and the information is not sent to any network entity. Therefore, it may be left to a manufacturer to decide the exact method to utilize for validation. However, minimal security requirements may be standardized, such as 'the integrity algorithm must provide equivalent or better security than SHA-1'.

Described herein is how AuV implements TRV Certificate management. Since the components of a system depend on the actual implementation, there is a need to harmonize the mechanisms used for device integrity. This may be achieved by standardizing the minimum requirements for the methods used for generating the trusted reference integrity metrics known as TRVs. These TRVs may be generated by manufacturers or by a TTP who digitally signs the values. Therefore, mechanisms to organize the information, generate TRVs, distribute them and use them are reviewed.

Described herein is first time TRV certificate initialization. After the complete development of the H(e)NB, the manufacturer performs a local integrity data initialization. In this process, all the software module names are collected in a device configuration data sheet. If any factory settings related to the configuration file are present, they are also included in the device configuration data sheet. The modules are executables and not source code. Initial provisioning of the configuration data is also performed. The device configuration data sheet schema follows a standard schema. The XML or the ASN.1 schema presented herein may be used as a baseline. All the attributes about the severity, compatibility, stage and others are populated based on the architecture of the device.

Figure 8:
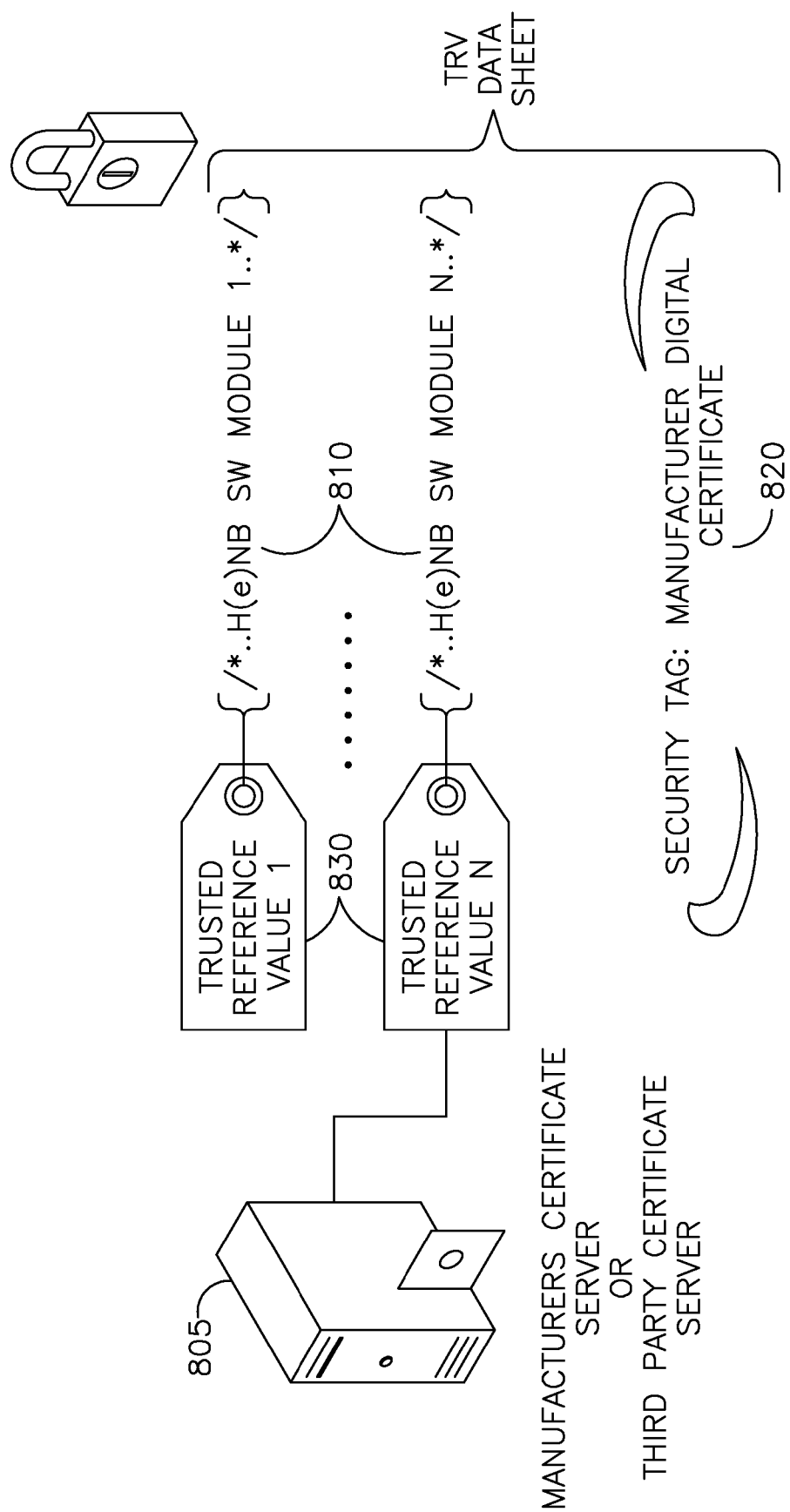
FIG. 8 shows an example of a certificate management architecture.

FIG. 8 shows a certificate management architecture 800. At a manufacturers' certificate server 805, all the modules entries 810 are populated with a reference integrity metric. The integrity method attribute and the TRV attribute are populated. The device configuration data sheet is then signed by the manufacturer using the private key 820. It may also be certified with respect to a root certificate issued by a TTP to the manufacturer. Thus the reference integrity metrics (RIMs) becomes the TRVs 830.

In an alternate architecture, the TRVs may be generated by a TTP. The manufacturer provides the executable and the partially completed device configuration sheet which lists all the modules and some populated attributes which may be filled in at the manufacturer's site. The TRVs which are the digest metrics are populated by the TTP. The TTP then digitally signs the device configuration certificate.

The device configuration data sheet may be maintained within the device since AuV is performed locally within the device. The device configuration data sheet must be kept inside the secure memory which may be accessed only by an authorized party. Alternatively, the device configuration data sheet has to be encrypted which may be decrypted in the H(e)NB as it is read and used. In either case, only the trusted environment (TrE) of the H(e)NB should have authority to release the device configuration data sheet for read access by an application, or to modify it.

During the secure start-up process, when the device performs the local measurements of the components, the generated digest is compared with the values specified in the device configuration data sheet. If a mismatch occurs then it is construed as a failure of the device integrity validation. The integrity of the device configuration data sheet must be verified before it is accessed. The integrity of the device configuration data sheet could also be verified after one or more integrity check failure(s) of any one or multiple component(s) specified within the data sheet.

Described herein are subsequent TRV certificate update procedures. For a deployed H(e)NB system, if a new software version is issued by the manufacturer, then the manufacturer may provide the device configuration data sheet along with the software modules to the H(e)MS/OAM server/remediation server. This may be done asynchronously by performing a 'PUSH' operation by the manufacturer. Such a PUSH may be scheduled based on the scheduled updates/upgrades that are agreed upon between the operator and the manufacturer based on the service agreement signed between them.

Following such a PUSH, an OAM procedure or TR069 procedure to update the firmware or software modules may be invoked which instructs the device to reboot at a scheduled time to perform a 'PULL' operation the software/firmware from the H(e)MS/OAM/remediation server. Encryption, signing and nonce's may provide security aspects such as confidentiality, integrity, and replay protection, respectively.

Alternatively, when the device configuration data sheet expires due to the scheduled expiry based on the software release schedule, the H(e)NB may start the firmware/software update process and begin a PULL for the software/firmware from the OAM/remediation server. Alternatively, the H(e)MS could perform scheduled PUSH of software updates based on a known schedule (e.g. obtained from the manufacturer) of software release.

Described herein are procedures based on TR069 or OMA DM architectures that support software/firmware downloads to the device. In the case of AuV, the TR069 protocol may provide support for remote management of the customer premise equipment. It may also provide support for device software/firmware updates. TR069 may be utilized to provide firmware/software updates to the H(e)NB device.

Figure 9:
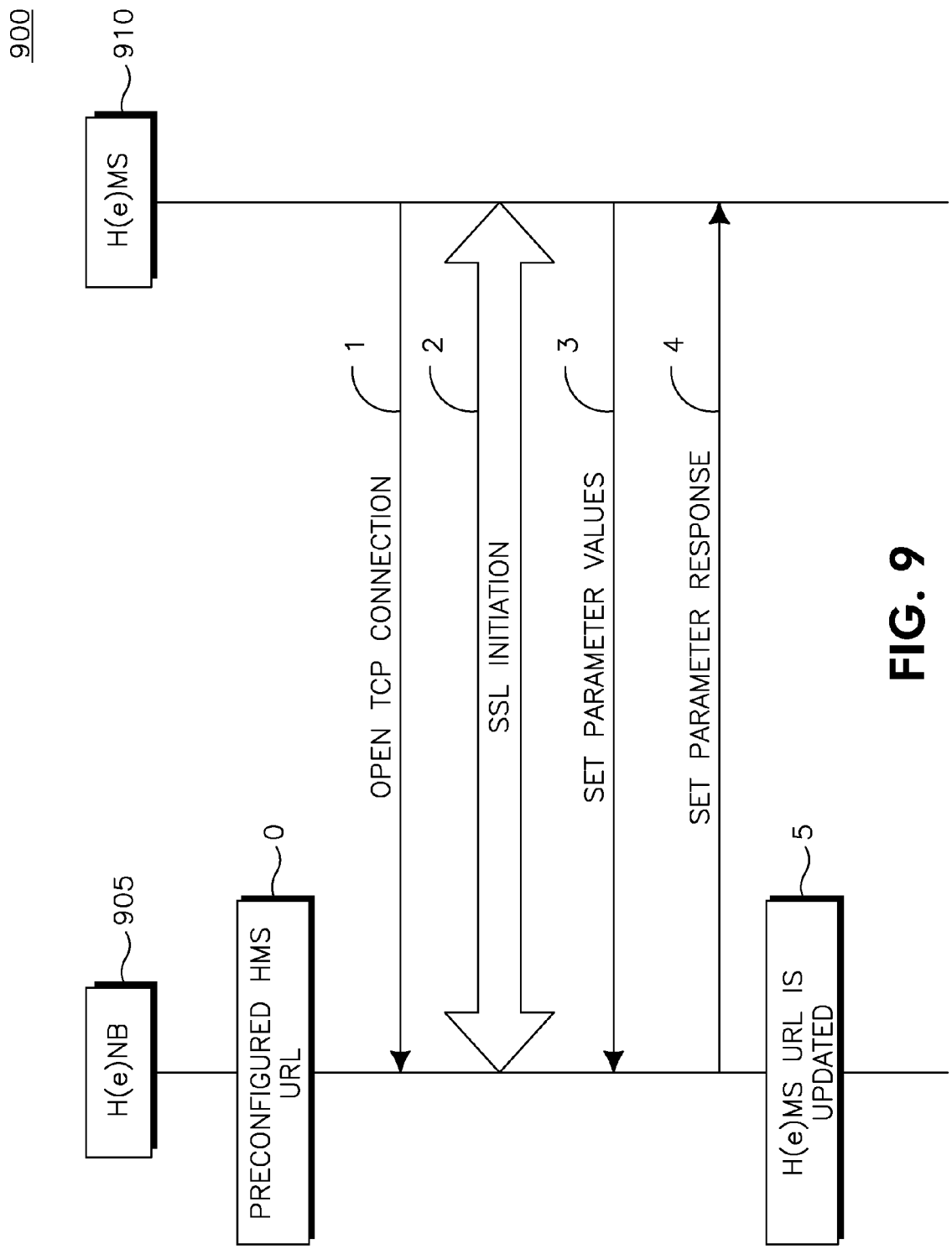
FIG. 9 shows an example of a reconfiguration of home evolved-NodeB (H(e)NB) (H(e)MS)

Described herein are example AuV procedures between a H(e)NB 905 and H(e)MS 910 for subsequent updates that may be performed at the H(e)NB 905 by the authorized administrator or by utilizing an URL update procedure as shown in FIG. 9. The H(e)NB 905 is initially configured with a default H(e)MS uniform resource locator (URL) in the ManagementServer.URL parameter (0) as stated previously with respect to H(e)MS discovery. This may be provisioned by the manufacturer. The H(e)MS 910 opens a transmission control protocol (TCP) connection (1). A secure socket layer (SSL) connection is established between the H(e)NB 905 and H(e)MS 910 to allow secure communications (2). The H(e)MS 910 initiates a remote procedure call (RPC) Method SetParameterValues and updates the ManagementServer.URL (3). After a successful update the SetParameterValuesResponse is sent by the H(e)NB 905 with the status field indicating success or failure (4). The H(e)NB 905 updates the H(e)MS URL (5).

Described herein are AuV procedures for supporting file transfer using TR069 for the H(e)NB-H(e)MS interface. TR069 supports file transfer by Unicast and Multicast transport protocols. Unicast protocols include HTTP/HTTPS, file transfer protocol (FTP), secure file transfer protocol (SFTP) and trivial file transfer protocol (TFTP). Multicast protocols include file delivery over unidirectional transport (FLUTE) and digital storage media command and control (DSM-CC). The support for HTTP/HTTPS is mandatory. For adapting TR069 for firmware/software download in the H(e)NB-H(e)MS interface, in addition to HTTP/HTTPS, FTP secure (FTPS) may also be utilized and would need to be added to TR069. FTPS (also known as FTP secure and FTP-SSL) is an extension to FTP that adds support for transport layer security (TLS) and SSL cryptographic protocols. Since the H(e)NB-H(e)MS interface utilizes a TLS-SSL interface, FTPS may be implemented for transfer of files.

TR069 also provides support for reusing the same TLS connection for downloading the file, spawning a new connection for downloading files which may exist in parallel or releasing the first session. After the download is complete, the TLS connection for signaling is established. If HTTP/HTTPS is used to download the file, then standard TR069 procedures may be utilized.

Described herein are example AuV procedures for remediation support. If the device integrity checks fail in AuV then a local distress flag may be set and the system reboots with a Fallback Code (FBC). The FBC may be stored securely in the device and may be loaded and executed if the secure start-up procedure (or any other process of the device that is deemed as 'essential' for ensuring the basic integrity of the device) fails. The FBC has the capability of basic communications with the core network and has the capability to send a distress signal to a pre-designated H(e)MS. The H(e)MS may have been updated by the H(e)MS discovery procedure. The contents of the distress signal may be stored securely within the FBC on the device, or may be provisioned by the MNO and securely stored as part of the device configuration data sheet. The distress signal may contain an error code information element indicating the details of the device integrity check failure. On receipt of the distress signal, the network may decide to update the complete image and the device configuration file containing the trusted reference values. An FTP server stores a package file containing the complete image, device configuration file and the installation instructions. The FTP server may be merged with the H(e)MS.

Figure 10:
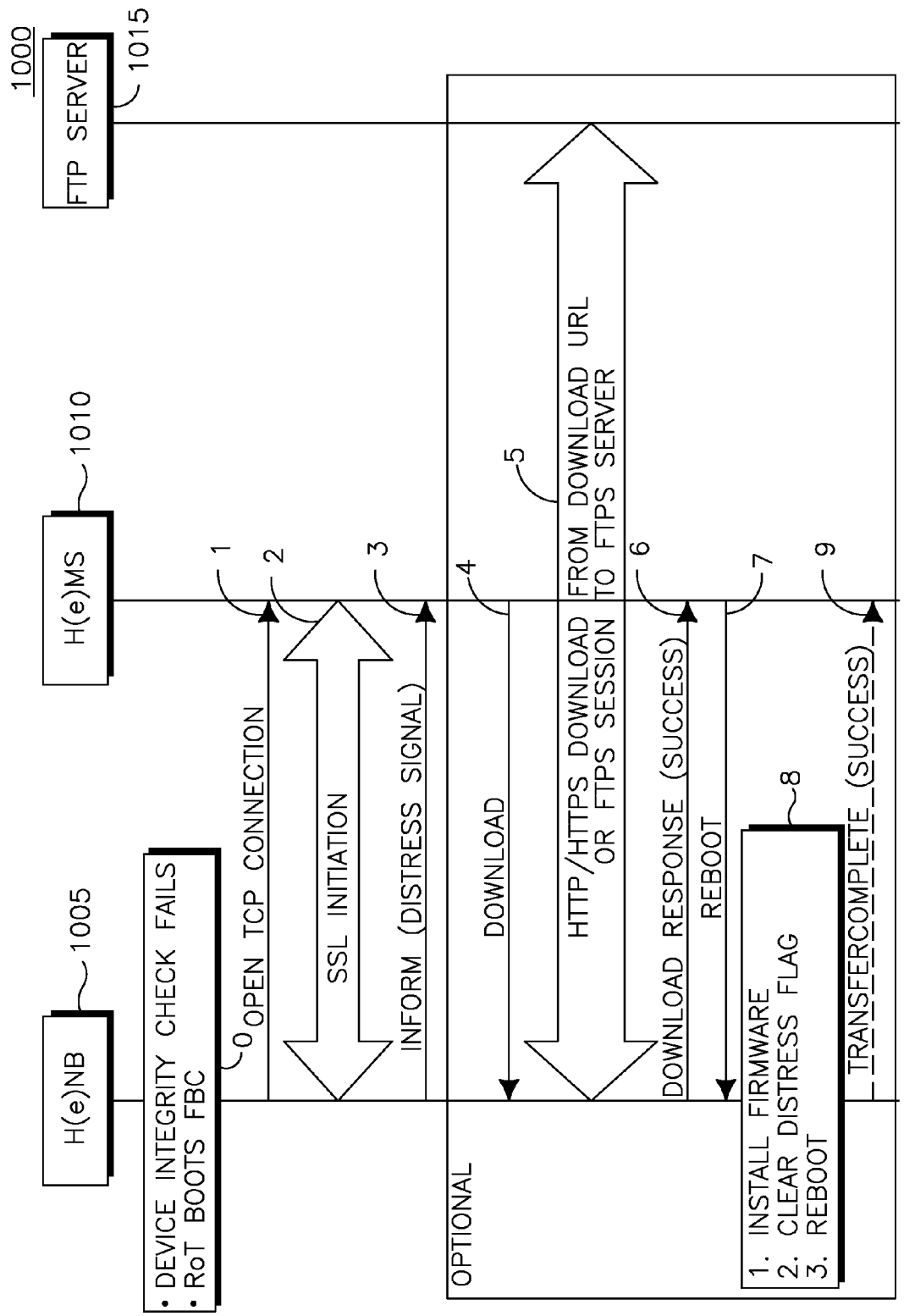
FIG. 10 shows an example of autonomous validation (AuV) remediation.

This procedure may be achieved by FBC supporting the TR069 protocol and an example flowchart 1000 is shown in FIG. 10 between a H(e)NB 1005, H(e)MS 1010 and FTP server 1015. If the device integrity check failed and the Root of Trust (RoT) has booted up the FBC at the H(e)NB 1005 (0), then the H(e)NB 1005 sets up a TCP connection to the pre-designated H(e)MS server 1010 (1). An SSL initiation is performed and/or transport layer security (TLS) is setup (2). The H(e)NB 1005 then invokes the RPC method INFORM, e.g., a distress signal, to the H(e)MS 1010. The distress signal may contain any combination of information elements such as the Device ID, Event, MaxEnvelopes and CurrentTime.

The Device ID is a structure that may contain a manufacturer name; an organizationally unique identifier (OUI) of the device manufacturer; a ProductClass that may be utilized to indicate the class of product for which the serial number applies or to indicate the serial number of the device in order to let the SerialNumber attribute to be utilized to indicate the TrE ID or the H(e)NB Id; and a Serial Number that may be used to send the serial number of the particular device or send the TrE ID or the H(e)NB ID.

The Event field may contain the event code that caused the RPC method Inform to be executed. A new event code (X_HeNB_FBC Invoked) may need to be defined to indicate that the device integrity check has failed and that FBC has been invoked to send this distress signal. The MaxEnvelopes value, which indicates to the ACS (e.g. H(e)MS) the maximum number of the occurrences of a parameter called "SOAP envelopes" that may be contained in a single HTTP response, may be set to 1. The value of the MaxEnvelope parameter may be one or greater. Since distress indication is intended to be sent only once, setting this value to 1 is appropriate. The CurrentTime field is the value of the current date and time known to the H(e)NB 1005. Thus, the Inform RPC method indicates to the H(e)MS 1010 that the device has failed the integrity check and is connecting for initiating a firmware/software update.

The remainder of procedure 1000 is optional. The H(e)MS 1010 may invoke the RPC method download and provides the URL of the location of the firmware or software and the device configuration data sheet (4). The following parameter values may be set. The CommandKey parameter is a string that may be used by the H(e)NB 1005 to refer to a particular download. This may be any string used to correlate the download and the responses. The FileType parameter may be set to "1 Firmware Upgrade Image" for the firmware/software image and "X_<OUI>_data_sheet" for the device configuration data sheet. The URL parameter is the URL of the download file. HTTP and HTTPS must be supported. Support of FTPS is also recommended for download. The Username parameter may be used by the H(e)NB 1005 to authenticate to the file server. The Password parameter may be used by the H(e)NB 1005 to authenticate to the file server. The FileSize parameter is the size of the file to be downloaded. Other parameters may also be set.

The H(e)NB 1005 connects to the FTP Server 1015 and downloads the firmware image (or software image) and the device configuration data sheet (5). The information at the FTP Server 1015 may be denoted as remediation information. Upon successful completion of the download a Download-Response with a status argument having a value of zero (indicating success), or a fault response to the download request (indicating failure) is sent (6). Alternative procedures may also be followed to indicate a successful or failed download. After a successful DownloadResponse, the H(e)MS 1010 may then invoke a reboot procedure in the H(e)NB 1005 (7). The RPC handler in the H(e)NB 1005 resets the local distress flag and boots normally to perform the local integrity check procedures (8). The signed package format may contain a reboot command, which may be used to instruct the H(e)NB 1005 to reboot after the firmware or software is updated. A TransferComplete RPC method may be invoked from the H(e)NB 1005 to indicate to H(e)MS 1010 that the procedure of firmware/software update has been successfully completed (9). Alternatively, a SeGW may send a message to the H(e)MS 1010 to indicate that the device has successfully booted which may be interpreted in the H(e)MS 1010 as a successful firmware/software update complete message.

Figure 11:
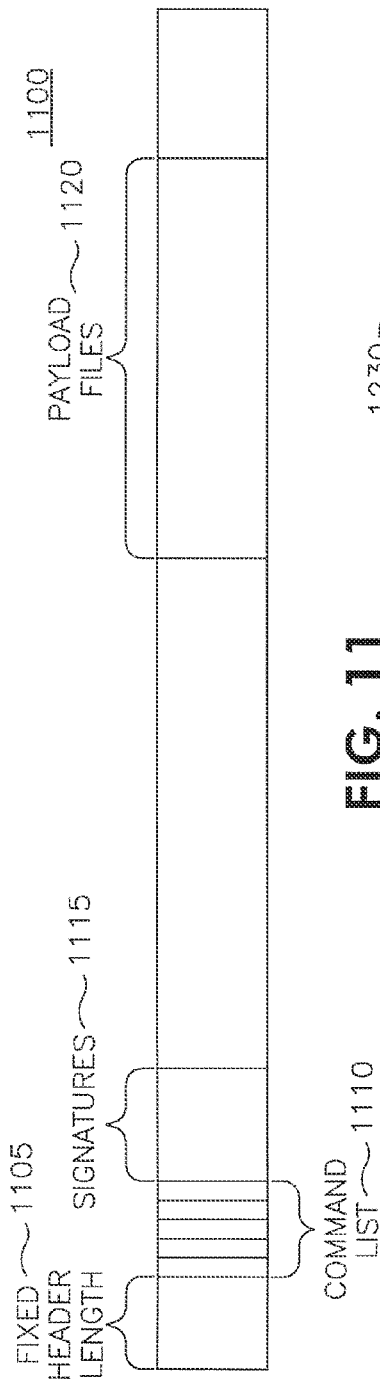
FIG. 11 shows an example of a file package format.

Described herein is an example file format 1100 that may be used for H(e)NB firmware/software updates and is shown in FIG. 11. A header 1105 may be a fixed length structure including a preamble, format version, and the lengths of the command list and payload components. A command list 1110 contains the sequence of instructions that may be executed to extract and install the files contained in the package. Each command may be in the form of a type-length-value (TLV). A signatures field 1115 may contain a Public Key Cryptography Standards (PKCS) #7 digital signature block that may contain a set of zero or more digital signatures. Payload files 1120 may include one or more files to be installed following the instructions in the command list 1110. In addition to the firmware/software update files, the device configuration data sheet is also packaged in the signed package format.

In order to support the requirements of storage classifiers, the following new H(e)NB specific commands may be added:
1) Store in Secure Non-Volatile memory (For data such as TRV or the configuration data sheet); and 2) Store in Non-Volatile Storage; or 3) Can be Stored in Volatile Storage.

Figure 12:
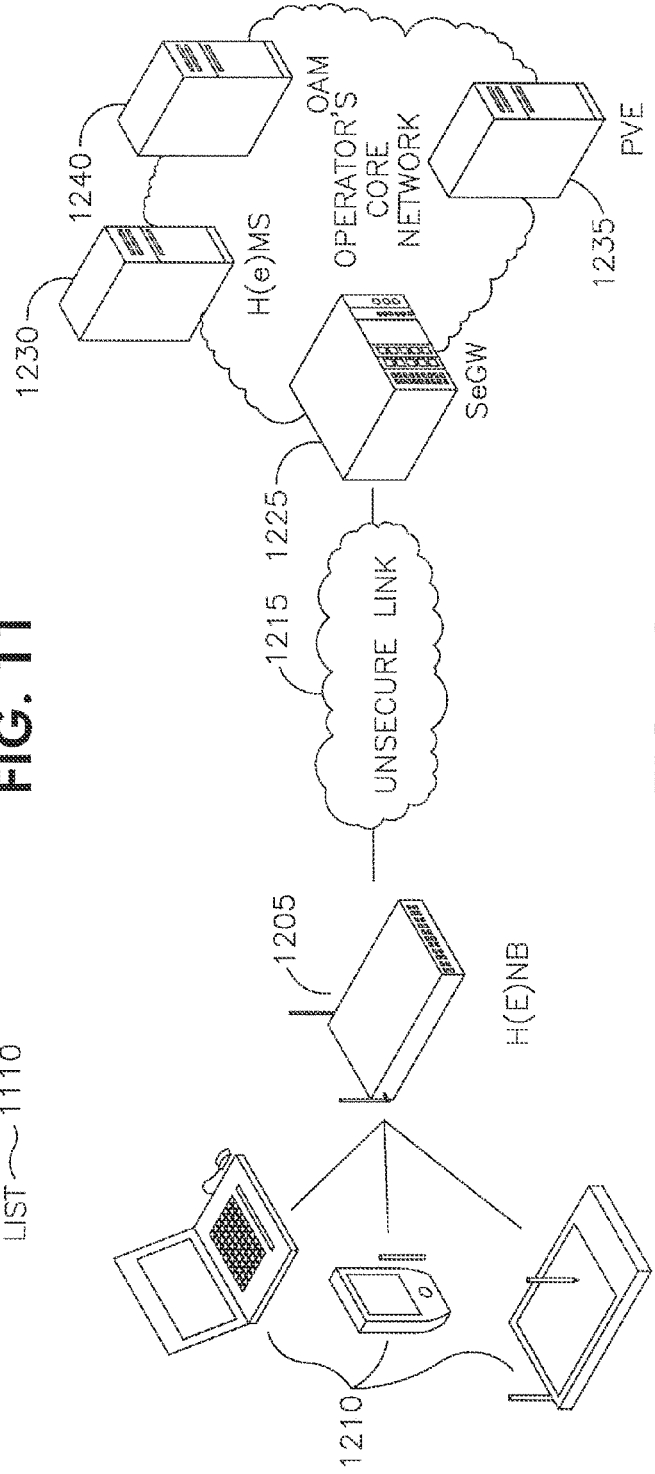
FIG. 12 shows an example network architecture of a semi-autonomous validation (SAV)

FIG. 12 shows example network architecture 1200 for SAV. A H(e)NB 1205 acts as a gateway for user equipment 1210 to communicate via a communication link 1215 to a core network 1220. The H(e)NB 1205 interacts with a SeGW 1225 over unsecured communications link 1215. The SeGW 1225 may allow authenticated H(e)NBs to access the core network 1220. A H(e)MS 1230 acts as the H(e)NB management server and provides support for remediation. The H(e)MS 1230 may support the standard protocols to manage the H(e)NB 1205. A platform validation entity (PVE) 1235 stores the policy that defines the actions to be taken when a certain set of functionalities in the H(e)NB 1205 fails. These failed functionalities are reported by the H(e)NB 1205 during the SAV process. An OAM 1240 is the operations, administration and management server. Although the H(e)MS 1230 and PVE 1235 are shown as separate entities, they may be merged together as a single network entity. Such a merged entity may be a single node per network operator or may be multiple nodes per operator.

Described herein are procedures with respect to SAV. In summary, before proceeding to perform a device authentication procedure, the TrE of the H(e)NB first performs a check of the integrity of certain pre-designated components such as, but not limited to, boot code, fallback code (FBC), basic communication code for SeGW, and code that performs procedures enabling the H(e)NB to access H(e)MS. In this step the verification of the integrity of the components may be performed locally by comparing the digest output from the integrity measurements to the specified values in the device configuration data sheet. If the components pass the integrity verification then they are loaded and executed.

Further checks may take place either by the TrE itself or by a measuring component in the H(e)NB external to the TrE, but integrity-protected by the TrE. In such later-stage checks, integrity of other components, configurations, or parameters of the rest of the H(e)NB may be checked when they are loaded or started, or at other, pre-defined run-time time events, wherever such are available to the measuring component. In this step, the verification of the integrity checks may performed locally.

The H(e)NB may then attempt to establish an Internet Key Exchange (IKEv2) security association with the SeGW. In the process, it authenticates itself to SeGW and verifies the authenticity of the SeGW. This may be performed by certificate exchanges and certificate authentication. If the authentication succeeds, the TrE conveys the result of the local integrity verification to the PVE, by compiling a list of failed functionalities that are affected by the failure of the components. The TrE may then sign the message (using a signing key protected by the TrE, thus protecting the integrity of the message), which asserts that the core part of the H(e)NB that performed the integrity measurement and verification, as well as reporting (to the PVE) of the list of failed functionalities, has either passed the integrity check performed on it (e.g., by the Root of Trust (RoT)) and therefore has been able to use the signing key and perform the signing operation, or otherwise is trusted inherently by way of its use of the secret signing key.

Figure 13A:
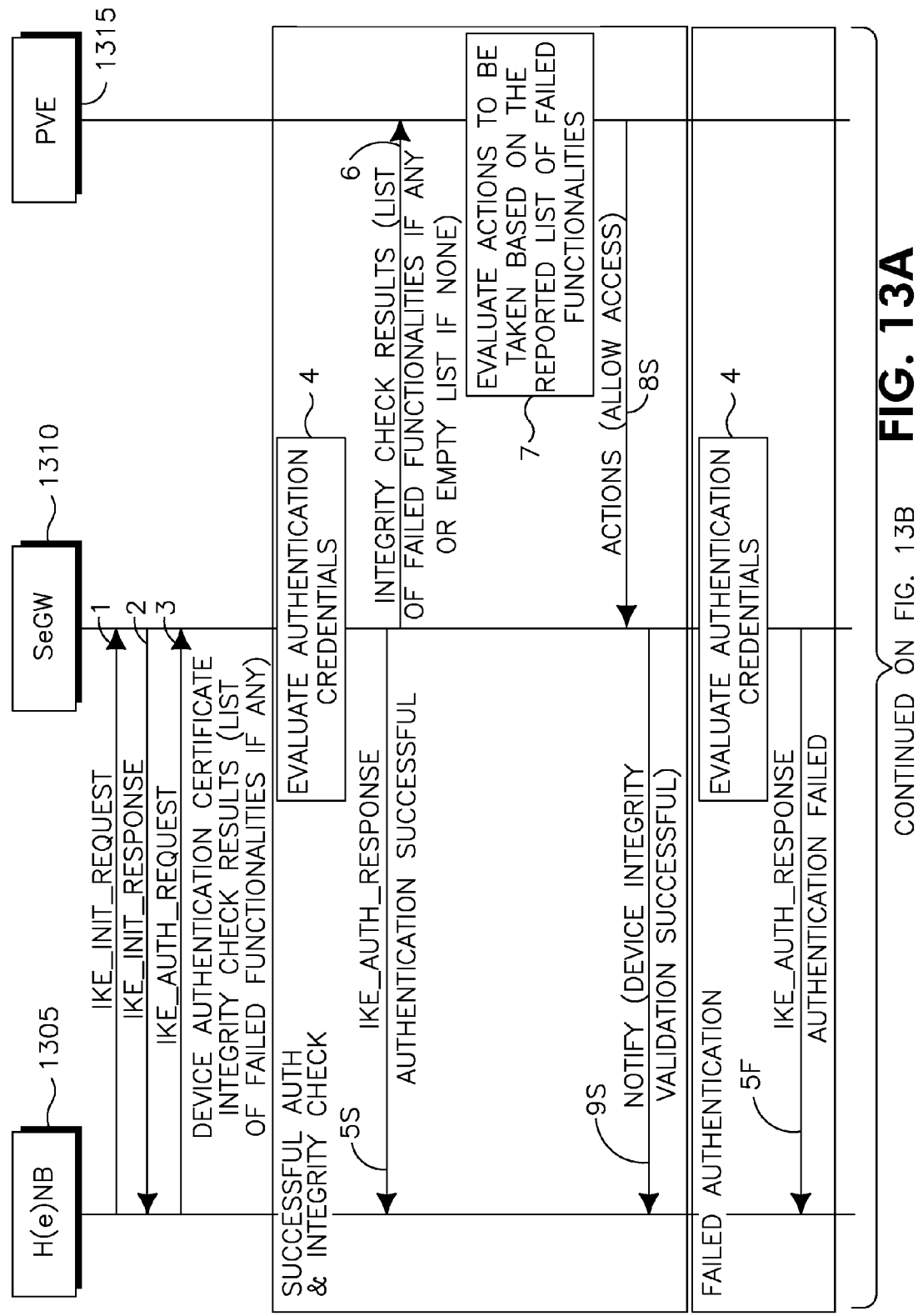
FIGS. 13A and 13B show an example flowchart for SAV procedures.
Figure 13B:
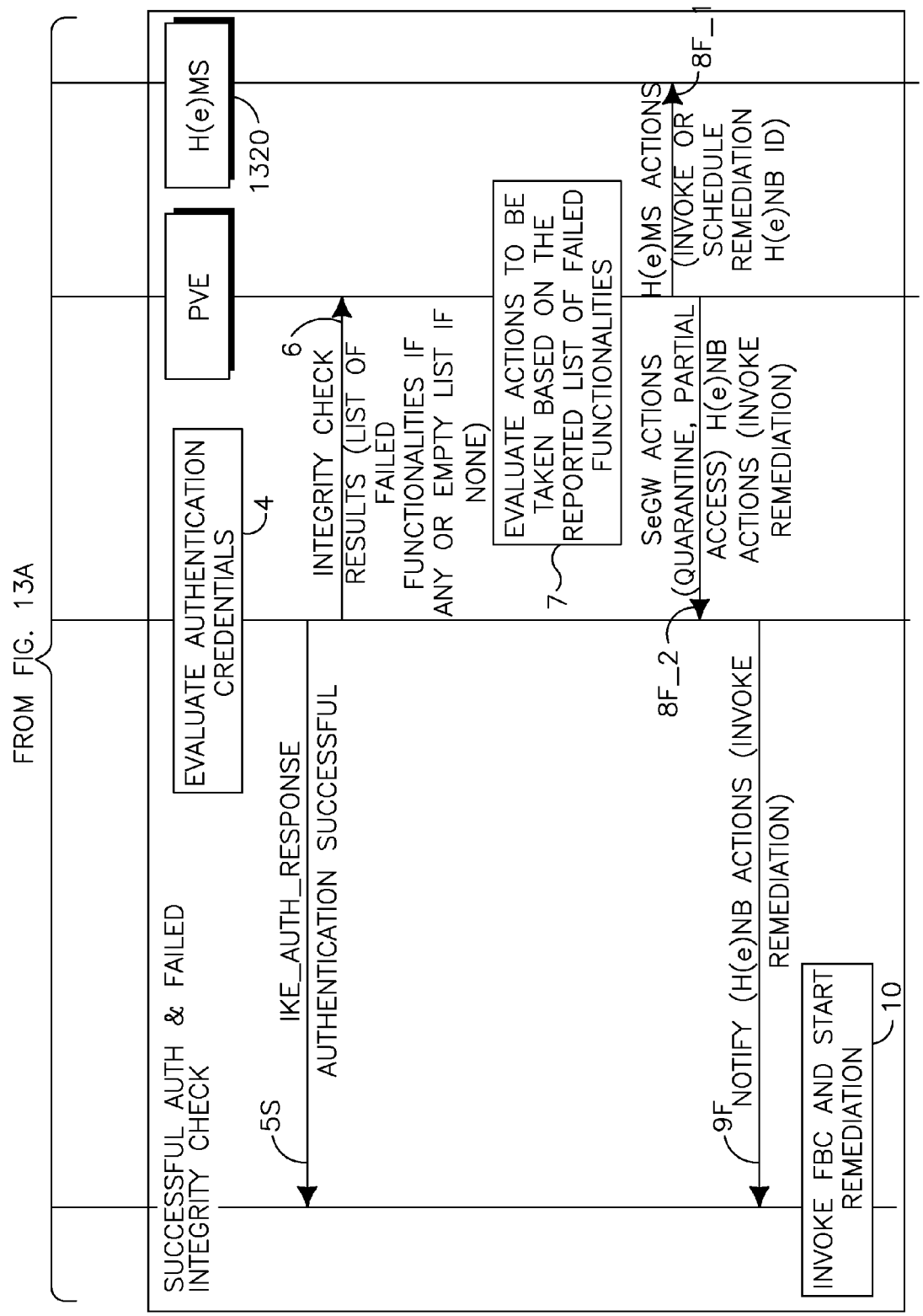

FIGS. 13A and 13B illustrate an example SAV procedure 1300 performed by a H(e)NB 1305, SeGW 1310 and PVE 1315. After the local integrity validation of component 1 and component 2 modules, the modules are loaded and executed. The results of the device integrity checks of the component 3 modules and the verification results are sent by the H(e)NB 1305 to the SeGW 1310 to be forwarded to the PVE 1315 (0).

The H(e)NB 1305 may send an IKE_INIT message to initiate establishment of the IKEv2 security association containing the security parameter indexes for cryptographic algorithms, version numbers, IKEv2 flags, Diffie-Hellman values and initiator nonce (1). The SeGW 1310 may send an IKE_INIT response to the IKE_INIT request message (2). The SeGW 1310 may choose a cryptographic suite from the H(e)NB 1305 and completes the Diffie-Hellman exchanges. The H(e)NB 1305 may send it's certificate in the IKE_AUTH_REQ for mutual authentication (3). It may also include the results of the integrity verification in the form of a list of failed functionalities. If the local integrity verification is successful then no such list of failed functionalities is included. In this case an empty list is sent. The relationship between components, modules and functionalities were described herein.

The SeGW 1310 may evaluate the authentication credentials of the H(e)NB 1305 and extracts the list of the functionality ID's to be sent to the PVE 1315 if it is present (4). If the authentication evaluation is successful, then the SeGW 1310 indicates this to the H(e)NB 1305 (5s). It may also sends it's own certificate to the H(e)NB in the response. If the authentication fails, then this is communicated to the H(e)NB 1305 (5f).

If the authentication is successful, and a list of failed functionalities was included in the IKE_AUTH message, then the SeGW 1310 forwards the list of the failed functionalities along with the H(e)NB ID to the PVE 1315 (6). If the list is absent, an empty list is sent to the PVE 1315. Based on the list of the failed functionality, the PVE 1315 may decide on the actions to be taken, such as quarantine the device, provide full access, provide partial access, or optionally request H(e)MS intervention for device remediation (7). If the PVE 1315 decides that that affected functionalities are not critical and therefore the H(e)NB 1305 may function, it indicates this decision to the SeGW 1310 to allow the device to access the network (8s). The SeGW 1310 indicates the result of device integrity evaluations performed by the PVE 1315. If the failed modules are not critical, then the PVE 1315 may allow the H(e)NB 1305 full access to the network (9s). If the PVE 1315 decides, based wholly or partially on a received empty list of failed functionality, that the H(e)NB should be trusted enough for authentication, then a state of 'validation' of the H(e)NB has been obtained. In this sense, validation is interpreted as the decision made by the PVE 1315 that indicates that the H(e)NB 1305 is trustworthy enough for further interaction with it from the network point of view.

If remediation is supported, then the PVE 1315 sends an indication to the H(e)MS 1320 to start remediation for the device identified by the H(e)NB ID in the message (8f_1). It may also include the list of the failed modules. Based on the list of the failed functionalities and the device specific configuration data sheet, the H(e)MS 1320 decides on the required firmware or software updates. If remediation is supported then PVE 1315 may send an indication to the H(e)NB 1305 to prepare for the H(e)MS 1320 initiated remediation (8f_2). Based on the response from the PVE 1315, the SeGW 1310 may restrict the access and inform the result to the H(e)NB 1305 (9f). The system reboots in FBC mode to start device initiated remediation (10). This step may be optional as the reboot may be handled by the H(e)MS 1320 using a TR069 protocol for remediation.

Described herein are H(e)MS and PVE discovery procedures for SAV. The H(e)NB may be configured with factory default settings containing the IP address of the PVE, H(e)MS and OAM. They may also be reconfigured by H(e)MS using the TR069 protocol by using the SetParameter and GetParameter RPC method supported by the TR069 protocol as illustrated in FIG. 9. Note that the procedure may also be used to change the addresses of the PVE. Additional parameter similar to ManagementServer.URL parameter (PlatformValidationServer.URL) may be defined to maintain the PVE URL at the H(e)NB. Similarly, the factory setting of PlatformValidationServer.URL mat be preconfigured at manufacture time and updated by TR069 subsequently.

Described herein are integrity methods and procedures for SAV. In SAV the device integrity checks may be performed locally. The result of the integrity checks may be passed to PVE in the form of list of failed functionalities. Therefore any of the integrity check methods described herein may be used as shown for example in paragraphs [0038]-[0040]. The integrity checks are not performed by the network entity. Therefore, it may be left to the manufacturer to decide the exact integrity method to utilize for validation. However, minimal security requirements may be standardized, such as the integrity method must provide equivalent or better security than SHA-1'.

Described herein are mechanisms that may be used for TRV certificate management in SAV. The interfaces and messages for supporting SAV are described first. The PVE-SeGW interface may use a using point-to-point protocol (PPP). PPP may provide support for authentication, encryption and compression. Alternatively, transport layer security/secure socket layer (TLS/SSL) may also be utilized.

There are multiple messages that may be sent over the PVE-SeGW interface. For example, the H(e)NB_Integrity_Information message may contains the list of the failed functionalities sent by the H(e)NB to the SeGW in the IKEv2 NOTIFY message and extracted by the SeGW. An example of the contents of this message is shown in Table 7.

TABLE 7

| Information Element | Description |
| --- | --- |
| H(e)NB ID | Contains the Unique identifier of H(e)NB or TrE ID. |
| (Optional) List of All Functionalities that were Integrity Checked | (Optional) This list is in TLV format and contains the list of all of the functionalities that were checked, thereby indicating the extent/scope of integrity checking performed on the device. This list would be sent only if the extent/scope of integrity checking is unknown to the verifier (e.g., PVE) in advance. (Alternative) Alternatively, and again optionally, a list of functionalities that WERE NOT checked of integrity may also be sent, instead of the list of functionalities that WERE checked. Such an alternative list may be smaller in size, if the list of unchecked functionalities are shorter than the list of checked functionalities. This method would only work if the entire list of all functionalities that CAN BE checked is already known to the verifier. |
| List of Failed Functionalities | This list is in TLV format and contains the list of the failed functionalities. The list may be empty if the H(e)NB reports that no functionalities have failed. Note that the report is generated by trusted and integrity verified code and therefore is believable due to the secure start-up process. |
| Nonce/Message Sequence Number | Nonce or message sequence number is to associate request and responses. |

The response to the H(e)NB_Integrity_Information message is the H(e)NB_Validation_Result which is shown in Table 8.

TABLE 8

| Information Element | Description |
| --- | --- |
| H(e)NB ID | Contains the Unique identifier of H(e)NB or TrE ID. |
| Nonce/Message Sequence Number | Nonce provided in H(e)NB_Integrity_Information to associate request and response. |
| SeGW Action | The actions the SeGW may perform include: 1. Allow complete access 2. Allow access to H(e)MS only 3. Quarantine 4. Disallow access |
| H(e)NB Action | These actions are forwarded to the H(e)NB in the IKEv2 NOTIFY message. The H(e)NB actions may be: 1. Full access allowed (No Updates Needed, No Errors Occurred) 2. Full access allowed (Updates Scheduled, Severity 4 Error Occurred) 3. Partial access allowed (Updates Scheduled, Severity 2 error occurred) 4. Access to H(e)MS only (prepare for immediate remediation, Severity 3 Error occurred) 5. Shut down (Shut down with local error code display, administrator will personally fix the system, Severity 1 error) |

The PVE-H(e)MS interface may also be based on PPP since they are both network entities. Alternatively, TLS/SSL may also be utilized. In one example, the PVE and H(e)MS may be one entity. An example message over this interface is shown in Table 9.

TABLE 9

| Information Elements | Description |
| --- | --- |
| H(e)NB ID | Contains the Unique identifier of H(e)NB or TrE ID. |
| (Optional) List of All Functionalities that were Integrity Checked | (Optional) This list is in TLV format and contains the list of all of the functionalities that were checked, thereby indicating the extent/scope of integrity checking performed on the device. This list would be sent only if the extent/scope of integrity checking is unknown to the verifier (e.g. PVE) in advance. (Alternative) Alternatively, and again optionally, a list of functionalities that WERE NOT checked of integrity may also be sent, instead of the list of functionalities that WERE checked. Such an alternative list may be smaller in size, if the list of unchecked functionalities are shorter than the list of checked functionalities. This method would only work if the entire list of all functionalities that CAN BE checked is already known to the verifier. |
| List of Failed Functionalities | This list is in TLV format and contains the list of the failed functionalities. The functionality IDs are described herein. If the list is NULL then this may indicate that the H(e)NB passed all integrity checks. |
| H(e)MS Action Indication | This indicates to the H(e)MS that device integrity validation was performed and as a result H(e)MS may perform some actions. The following actions may be performed: 1. Immediate Remediation 2. Schedule Remediation 3. Administrator Intervention Required |

Alternatively, the PVE may just send the list of the failed functionalities (or, optionally, also the list of either all functionalities that were integrity checked, or a list of all functionalities that were NOT integrity checked) and the H(e)MS decides on the action itself. This is shown in Table 10. The following actions may be performed by the H(e)MS: Immediate Remediation, Schedule Remediation, and Administrator Intervention Required.

TABLE 10

| Information Element | Description |
| --- | --- |
| H(e)NB ID (Optional) List of All Functionalities that were Integrity Checked | Contains the Unique identifier of H(e)NB or TrE ID also. (Optional) This list is in TLV format and contains the list of all of the functionalities that were checked, thereby indicating the extent/scope of integrity checking performed on the device. This list would be sent only if the extent/scope of integrity checking is unknown to the verifier (e.g. PVE) in advance. (Alternative) Alternatively, and again optionally, a list of functionalities that WERE NOT checked of integrity may also be sent, instead of the list of functionalities that WERE checked. Such an alternative list may be smaller in size, if the list of unchecked functionalities are shorter than the list of checked functionalities. This method would only work if the entire list of all functionalities that CAN BE checked is already known to the verifier. |
| List of Failed Functionalities | This list is in TLV format and contains the list of the failed functionalities. The functionality IDs are described in Section above. If the list is NULL then this may indicate that the H(e)NB passed all integrity checks. |

Described herein is a H(e)NB architecture and functionality with respect to SAV. The H(e)NB architecture may include an external TrE integrity checker. The H(e)NB's TrE may delegate the task of integrity verification of the components for which the task of integrity verification was a responsibility of TrE, to an external entity that may be hardware and/or software implemented. Such a case may be used if the TrE is not fast enough or if it does not have enough resources to perform the device integrity checks. In such cases, the TrE verifies the integrity and authenticity of the hardware and/or software entity which will be taking up the task of device integrity validation. After a successful verification, the TrE allows the external integrity checker to perform the task and report the results and the measurement data to TrE.

The H(e)NB entity may have a local time server to provide time-stamps to various events, reports and communications with the network. Such a time server may use network time protocol (NTP) to sync up the time. The time server code and the NTP code may also be integrity verified before they are executed by the TrE or the external TrE integrity checker.

The H(e)NB architecture may also provide binding of validation and authentication. The binding between the validation and the authentication may be provided by the IKEv2 session, in addition to the mechanism used for binding of validation and authentication in the case of AuV, i.e., release of sensitive keys and authentication functionality only upon the integrity check pass. The authentication certificate and the result of the local validation in SAV may be sent in the IKEv2 IKE_AUTH_REQ message. The SeGW filters out the list of failed modules and forwards it to the PVE. If no such list is included in the message, it then relays this information to the PVE. The PVE decides the future actions and indicates the results to SeGW and in some cases to the H(e)MS.

In an alternative method of binding, the H(e)NB is pre-equipped with a key pair, of which the private part is stored securely inside the TrE of the H(e)NB and the public part is made available to the H(e)NB. The manufacturer of the H(e)NB could generate this key pair and provision the private and public keys accordingly. To create a binding of validation and authentication by cryptographic means, the H(e)NB encrypts the message (e.g., a IKE_AUTH response message) that it receives from a AAA server (in which the AAA server requests the H(e)NB to compute and send back to the AAA server a secret-based computed authentication material) with the public key from the certificate and forwards the encrypted data to the TrE. The TrE then decrypts the data and computes the secret-based authentication material (e.g., such as the EAP-AKA RES parameter if symmetric authentication is used, or AUTH parameter based on use of private key if a certificate based authentication is used) needed to verify the authenticity of the H(e)NB's identity to the AAA.

In an alternative method of binding, the keys and other sensitive computational capability of the TrE that are used by the IKEv2-based device authentication application of the H(e)NB are not made accessible to such application unless a successful local integrity check result becomes known to the TrE of the H(e)NB.

Described herein are the policy specifications stored in the H(e)NB and PVE. The H(e)NB Device Configuration File describes the policies that are stored in the H(e)NB describing the attributes such as functionality ID, component ID and the module ID, which were described in detailed herein. The device configuration sheet is initialized at the manufacturer time. The procedure for initialization of this information and subsequent updates for AuV were described herein and are applicable to the SAV case.

The PVE Policy Configuration File may contain a mapping between the failed functionality and the SeGW actions, H(e)NB Actions, and H(e)MS actions. Based on the list of failed functionalities, the PVE may decide on the actions to be taken by H(e)NB, SeGW and H(e)MS. Table 11 defines the actions.

TABLE 11

| Failed Functionality Description | H(e)NB Action | SeGW Action | H(e)MS Action |
| --- | --- | --- | --- |
| Secure boot loader | Shut Down | Quarantine | Administrator Intervention |
| TrE | Shut Down | Quarantine | Administrator Intervention |
| Integrity Validation Engine | Shut Down | Quarantine | Administrator Intervention |
| Fall Back Code | Shut Down | Quarantine | Administrator Intervention |
| Operating System | Shut Down | Quarantine | Administrator Intervention |
| H(e)MS subsystem | Partial Access Allowed | Allow complete access | Schedule Remediation |
| Uu interface | Partial Access Allowed | Allow complete access | Schedule Remediation |
| Iuh interface | Partial Access Allowed | Allow complete access | Schedule Remediation |

TABLE 11-continued

| Failed Functionality Description | H(e)NB Action | SeGW Action | H(e)MS Action |
|---|---|---|---|
| HGm Interface | Partial Access Allowed | Allow complete access | Schedule Remediation |
| HUt Interface | Partial Access Allowed | Allow complete access | Schedule Remediation |
| S1-MME interface | Partial Access Allowed | Allow complete access | Schedule Remediation |
| S1-U interface | Partial Access Allowed | Allow complete access | Schedule Remediation |
| I2 (SIP) interface | Partial Access Allowed | Allow complete access | Schedule Remediation |
| Iu-CS interface | Access to H(e)MS only | Access to H(e)MS only | Immediate Remediation |
| Iu-PS interface | Access to H(e)MS only | Access to H(e)MS only | Immediate Remediation |
| E, Nc, Nb interface | Partial Access Allowed | Allow complete access | Schedule Remediation |
| RUA services | Partial Access Allowed | Allow complete access | Schedule Remediation |
| HNBAP services | Partial Access Allowed | Allow complete access | Schedule Remediation |
| HNB GW Discovery | Partial Access Allowed | Allow complete access | Schedule Remediation |
| HNB Registration | Access to H(e)MS only | Access to H(e)MS only | Immediate Remediation |
| WTRU Registration for HNB | Access to H(e)MS only | Access to H(e)MS only | Immediate Remediation |
| Access control management | Access to H(e)MS only | Access to H(e)MS only | Immediate Remediation |
| Time Management | Full Access Allowed | Allow complete access | Schedule Remediation |
| CSG management | Access to H(e)MS only | Access to H(e)MS only | Immediate Remediation |
| Mobility Management | Access to H(e)MS only | Access to H(e)MS only | Immediate Remediation |
| NAS Node selection function | Partial Access Allowed | Allow complete access | Schedule Remediation |
| Paging Optimization | Full Access Allowed | Allow complete access | Schedule Remediation |
| Transport Address Mapping | Access to H(e)MS only | Access to H(e)MS only | Immediate Remediation |
| Charging | Access to H(e)MS only | Access to H(e)MS only | Immediate Remediation |
| Emergency Services | Access to H(e)MS only | Access to H(e)MS only | Immediate Remediation |
| QoS Management | Access to H(e)MS only | Access to H(e)MS only | Immediate Remediation |
| Local IP Access | Access to H(e)MS only | Access to H(e)MS only | Immediate Remediation |
| Managed Remote Access | Full Access Allowed | Allow complete access | Schedule Remediation |
| HNB support for legacy CN | Full Access Allowed | Allow complete access | Schedule Remediation |
| Inbound Handover Support | Access to H(e)MS only | Access to H(e)MS only | Immediate Remediation |
| Roaming | Access to H(e)MS only | Access to H(e)MS only | Immediate Remediation |
| SCCP connectionless comm to MSC SGSN | Partial Access Allowed | Allow complete access | Schedule Remediation |
| OAM subsystem | Partial Access Allowed | Allow complete access | Schedule Remediation |
| Display subsystem | Full Access Allowed | Allow complete access | Schedule Remediation |
| USIM subsystem | Access to H(e)MS only | Access to H(e)MS only | Immediate Remediation |
| HPM subsystem | Access to H(e)MS only | Access to H(e)MS only | Immediate Remediation |
| IMS interworking IP-PABX interface | Access to H(e)MS only | Access to H(e)MS only | Immediate Remediation |
| Security Functions | Access to H(e)MS only | Access to H(e)MS only | Immediate Remediation |

TABLE 11-continued

| Failed Functionality Description | H(e)NB Action | SeGW Action | H(e)MS Action |
|---|---|---|---|
| RAB management | Access to H(e)MS only | Access to H(e)MS only | Immediate Remediation |
| Radio Resource Management | Access to H(e)MS only | Access to H(e)MS only | Immediate Remediation |
| Iu Link Management | Access to H(e)MS only | Access to H(e)MS only | Immediate Remediation |
| Iu U-plane (RNL) Management | Partial Access Allowed | Allow complete access | Schedule Remediation |
| Iu-Coordination Functions | Partial Access Allowed | Allow complete access | Schedule Remediation |
| Provisioning Functions | Full Access Allowed | Allow complete access | Schedule Remediation |
| Hardware Failure | Shut Down | Quarantine | Administrator Intervention |

Described herein are methods for supporting remediation in SAV. In order to support remediation, the H(e)NB interacts with the H(e)MS. This connection may be through the SeGW or directly over the internet using TLS/SSL. If during the secure start-up process, the device integrity check fails for stage 1 or stage 2 code, which are pre-designated by the manufacturer and contains the code necessary for authentication and communication with SeGW along with the code for TrE, then the FBC is executed and remediation is attempted.

FIG. 14 shows an example flowchart 1400 for SAV remediation involving a H(e)NB 1405, H(e)MS 1410 and a FTP server 1415. If device integrity check fails and after RoT boots up using the FBC (0), the H(e)NB 1405 sets up a connection (e.g., by use of a TCP connection) to the pre-designated H(e)MS server 1410 (1). An SSL initiation is then performed and/or TLS is then setup (2). The H(e)NB 1405 then invokes the RPC method Inform (e.g., a distress signal) with the H(e)MS 1410 (3). The distress signal may include a Device ID, an Event, MaxEnvelopes and CurrentTime.

The Device ID is a structure that may contain a manufacturer name; organizationally unique identifier of the device manufacturer (OUI); a ProductClass that is utilized to indicate the class of product for which the serial number applies or may be utilized to indicate the serial number of the device in order to let the SerialNumber attribute to be utilized to indicate the TrE ID or the H(e)NB Id; and the Serial Number field that may be used to send the serial number of the particular device or may be used to send the TrE ID or the H(e)NB ID.

The Event field may contain the event code that caused the RPC method Inform to be executed. In order to adapt TR069 to SAV remediation, a new event code (X_HeNB_FBC Invoked) may need to be defined to indicate that device integrity check has failed and that FBC has been invoked to send this distress signal. The MaxEnvelopes value is set to 1. This value may be ignored but is set to 1. The CurrentTime field is set to the value of the current date and time known to the H(e)NB 1405.

The Inform RPC method indicates to the H(e)MS that the device has failed the integrity check and is connecting for initiating a firmware update. The H(e)MS then invokes the RPC method Upload to indicate to the H(e)NB to upload a list of failed functionalities and the manufacturer specific list of error codes (4). These error codes may refer to the software modules corresponding to the components that have failed the integrity checks or may contain debug specific error codes. The URL of the FTP Server 1415 where the file must be uploaded to is provided. Note that the FTP Server 1415 may be maintained by the manufacturer. The FTP Server 1415 may be the remediation server provided by the manufacturer.

The H(e)MS 1410 indicates to the FTP Server 1415 to prepare for upload of the list of failed functionalities by sending the message Prepare_For_Upload (5). The H(e)NB 1405 then invokes the HTTP/HTTPS/FTPS procedures to upload the file containing the list of the failed functionalities (6). After reception of the file, the FTP Server 1415 or the H(e)MS 1410 when the H(e)MS collects the uploaded file, evaluates the required patch or firmware/software update to fix the problems (6a). If the file containing the list of failed functionalities is uploaded to the FTP Server 1415, after the evaluation of the required patch, the FTP Server 1415 sends the Download_Package_Ready message to the H(e)MS (7). If the H(e)MS had collected the uploaded file, then this message is not required. Alternatively, this message may also not be required if the functionalities of H(e)MS 1410 and the FTP Server 1415 are merged.

Alternatively, the information may be received directly from PVE and steps 1 through 5 may not be needed.

The H(e)MS 1415 then invokes the RPC method Download and provides the URL of the location of the firmware or software and the device configuration data sheet (8). The following parameter values may be set. The CommandKey parameter is a string that may be used by the H(e)NB 1405 to refer to a particular download and may be any string. It is used to correlate the download and the responses. The FileType parameter may be set to "1 Firmware Upgrade Image" for the firmware image and "X_<OUI>_data_sheet" for the Device Configuration data sheet. The URL parameter is the URL of the download file. HTTP and HTTPS must be supported. Support of FTPS may also be recommended for download. The Username parameter may be used by the H(e)NB 1405 to authenticate to the FTP Server 1415. The Password parameter may be used by the H(e)NB 1405 to authenticate to the FTP server 1415. The FileSize parameter is the size of the file to be downloaded. Other parameters may be set according to the TR069 protocol requirements.

The H(e)NB 1405 connects to the FTP Server 1415 and downloads the firmware or software image and the device configuration data sheet (9). Upon successful completion of the download a DownloadResponse with Status argument having a value zero (indicating success), or a fault response to the Download request (indicating failure) may be sent (10). The alternative procedures described herein may also be followed to indicate a successful or failed download.

After a successful DownloadResponse, the H(e)MS 1415 then invokes a Reboot procedure in the H(e)NB 1405 (11). The RPC handler in the H(e)NB 1405 resets the local distress flag and boots normally to perform the local integrity check procedures as indicated above (11a). The signed package format may contain a reboot command, which is used to instruct the H(e)NB 1405 to reboot after the firmware or software is updated.

Optionally, a TransferComplete RPC method may be invoked from H(e)NB to indicate to H(e)MS that the procedure of firmware/software update has been successfully completed (12). Note that alternatively, the SeGW may send a message to the H(e)MS to indicate that the device has successfully booted which may be interpreted by the H(e)MS as a successful firmware or software update complete message.

Figure 15:
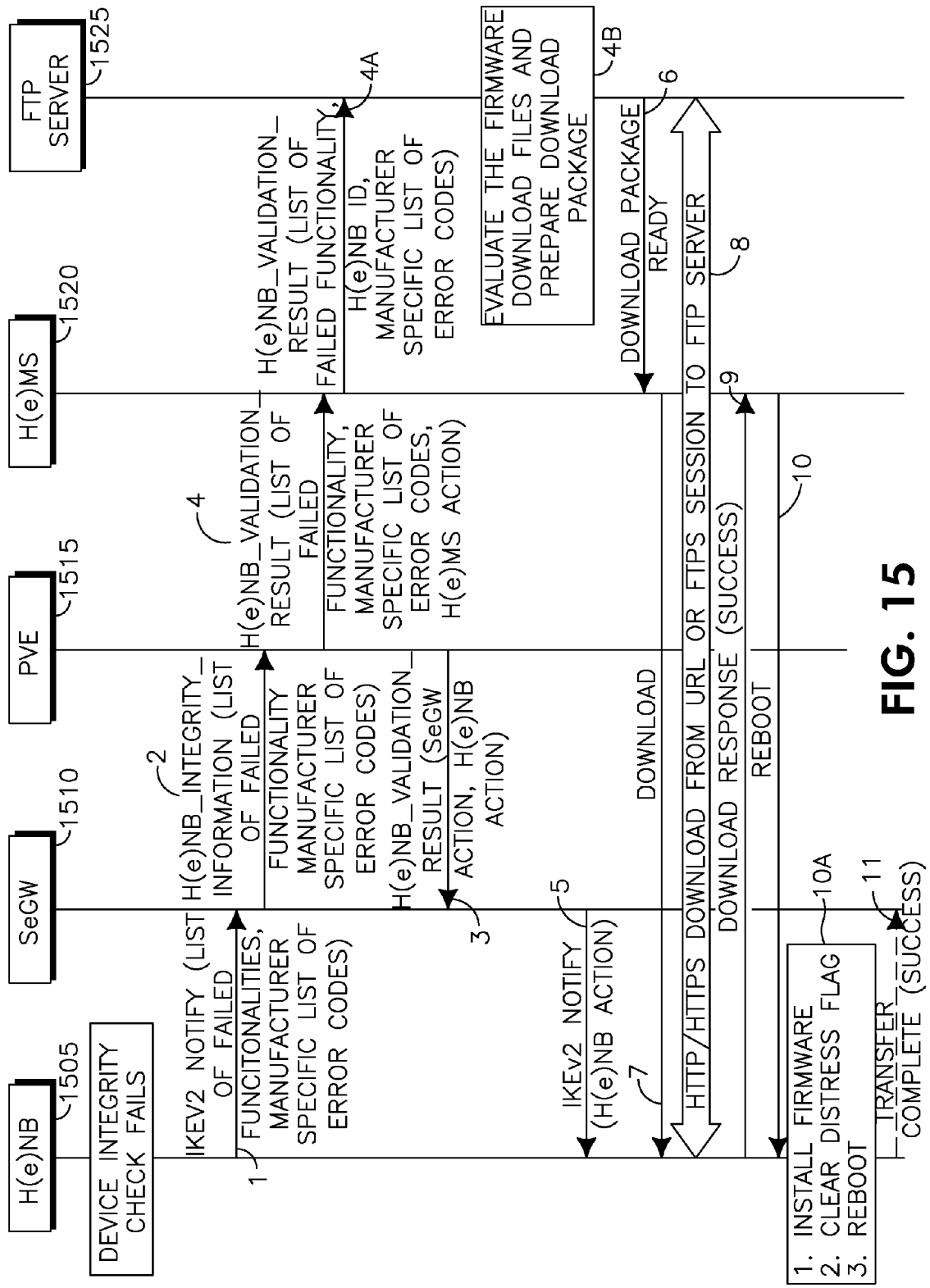
FIG. 15 illustrates example results of an integrity check.
Figure 16:
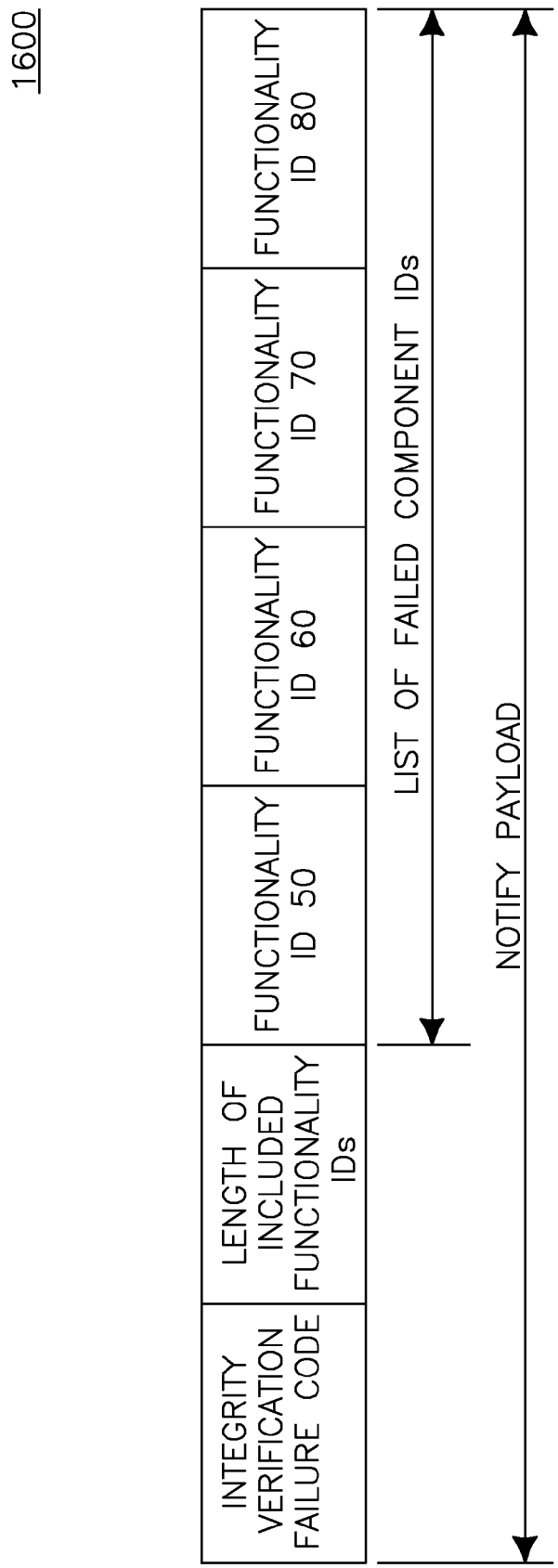
FIG. 16 shows example lists of failed functionalities.

FIG. 15 shows a flowchart 1500 for an embodiment of SAV remediation by the PVE. The procedure involves H(e)NB 1505, SeGW 1510, PVE 1515, H(e)MS 1520 and FTP Server 1525. During the secure start-up process if the stage 1 code and stage 2 code passes the integrity check and is loaded and executed and authentication is performed successfully, then the H(e)NB 1505 may communicate with the SeGW 1510 send the result of local integrity checks in the IKEv2 message (1). The H(e)NB 1505 sends a list of failed functionalities and the list of manufacturers specific error codes to the SeGW 1510 in the IKEv2 NOTIFY message 1600 illustrated in FIG. 16.

The SeGW 1510 may then send the results of the local integrity check in a H(e)NB_Integrity_Information message that may contain a list of failed functionalities and/or manufacturer specific list of error codes (2). Based on the received information, the PVE 1515 may respond with a H(e)NB_Validation_Result message to the SeGW 1510 that may include a SeGW action and H(e)NB action (3). The SeGW 1510 may forward the H(e)NB action to the H(e)NB 1505 (5). The H(e)NB may prepare accordingly and make preparations for remediation locally or take no action.

Based on the received information, the PVE may also send a H(e)NB_Validation_Result message to the H(e)MS 1520 that may contain a list of failed functionalities, manufacturer specific list of error codes, H(e)MS action(s) and H(e)NB ID (4). Based on the action sent by the PVE 1515 to the H(e)MS 1520, the H(e)MS 1520 may schedule a remediation update or an immediate update. In both cases, the H(e)MS 1520 sends the list to the manufacturer specific remediation FTP server.

The H(e)MS 1520 may forward the H(e)NB_Validation_Result message to the FTP Server 1525 that may contain a list of failed functionalities, H(e)NB ID, and manufacturer specific list of error codes (4a). The FTP Server 1525 may evaluate the firmware/software download files and prepare the download package (4b). The FTP Server 1525 sends a Download_Package_Ready message to the H(e)MS 1520. If the H(e)MS 1520 collects the uploaded file, then this message may not be required. Alternatively, this message may not be sent if the H(e)MS 1520 and FTP Server 1525 are merged.

The H(e)MS 1520 then invokes the RPC method Download and provides the URL of the location of the firmware/software and the Device Configuration data sheet (7). The following parameter values may be set. The CommandKey parameter is a string that may be used by the H(e)NB 1505 to refer to a particular download and may be any string that may be used to correlate the download and the responses. The FileType parameter may be set to "1 Firmware Upgrade Image" for the firmware/software image and "X_<OUI>_data_sheet" for the Device Configuration data sheet. The URL is the URL of the download file. HTTP and HTTPS must be supported. Support of FTPS is also recommended for download. The Username parameter may be used by the H(e)NB 1505 to authenticate to the file server. The Password parameter may be used by the H(e)NB 1505 to authenticate to the file server. The FileSize parameter is the size of the file to be downloaded. Other parameters may be set according to the TR069 protocol requirements.

The H(e)NB 1505 connects to the FTP Server 1515 and downloads the firmware/software image and the device configuration data sheet (8). Upon successful completion of the download a DownloadResponse with Status argument having a value zero (indicating success), or a fault response to the Download request (indicating failure) is sent to the H(e)MS 1520 (9). The alternative procedures described in TR069 may also be followed to indicate a successful or failed download.

After a successful download response, the H(e)MS 1515 then invokes a Reboot procedure in the H(e)NB 1505 (10). The RPC handler in the H(e)NB 1505 resets the local distress flag and boots normally to perform the local integrity check procedures as indicated above (10a). Alternatively, the signed package format contains a reboot command, which is used to instruct the H(e)NB 1505 to reboot after the firmware/software is updated. A transfer complete may be sent to the SeGW 1510 after firmware/software update has been successfully completed (11). Alternatively, a TransferComplete RPC method may be invoked from H(e)NB 1505 to indicate to H(e)MS 1520 that the procedure of firmware/software update has been successfully completed. In another example, the SeGW 1510 may send a message to H(e)MS 1520 to indicate that the device has successfully booted which may be interpreted by the H(e)MS 1520 as a successful firmware/software update complete message.

Described herein is an architecture and method for using SAV in a platform validation and management (PVM) architecture. The PVM provides a systematic method to validate and manage devices, when they first try to attach to a communication network and subsequent monitoring of device integrity, relying in part on security technology from Trusted Computing. The PVM provides: 1) validating a device before network connection is allowed; 2) managing device configuration over-the-air (OtA); 3) secure start-up by checking RIMs on component load/start; and 4) installing new RIMs on a device for configuration change—RIM ingestion.

PVM may use the following terminology. The term "verification" may used for the internal verification of device components during secure start-up, while the term "validation" is used for the whole process of checking a device by an external entity. Thus, an introduction of "internal" vs. "external" validation is avoided. Where verification is applied in the usual sense of cryptographic checks or matching of data, this is explicitly noted so that no confusion should arise.

PVM uses at least a SeGW, PVE, and a DMS. Since the TrE in the device performs the validation critical tasks inside the device, generally the TrE communicates with the other entities. While other components of the device, for example network interfaces, which are needed for this communication are not necessarily an integrated part of the TrE, it should be possible for the TrE to assess the integrity of these components to ensure end-to-end security.

The strict separation of duties requires that each entity is restricted to its core tasks. For example, the SeGW builds the secure interface between the (un)trusted device and the MNO's CN. It acts as barrier and network access control and enforcement instance for the MNO's CN. It also performs all security related functions which are necessary to act as such a barrier, including authentication, encryption/decryption of communication with device, security association and session establishment. The SeGW may be used as an example of a network entity that builds the border between the MNO's CN and the outside world, such as an external device. It may be possible to perform device validation using PVM methods without the need of the SeGW. Doing so may include a direct connection of devices to the DMS using secured connections, such as Transport Layer Security (TLS).

With respect to the PVE, it acts as the validation entity in the CN and performs integrity validation. It receives integrity verification data and checks if reported values are known and good. It issues statements about device integrity to other entities in the CN.

With respect to the DMS, it acts as the central entity for management of device components including software updates, configuration changes, OTA management and failure mode remediation. The DMS is, in taking up this function based on platform validation, similar to an enhanced version of the H(e)MS.

In addition to the entities above, PVM also includes a RIM manager (RIMman). RIMman performs the following tasks including management and provisioning of reference values for comparison in validation. It also manages certificates, in particular, ingestion of foreign RIM certificates, verification of RIM certificates, generation of (operator specific) RIM certificates, and check of certificate validity by, for example, revocation, time limits and trust relationships. That is, the RIM manager is the unique entity, which is authorized to manage the validation database (V_DB). The V_DB and RIMman are protected CN components. Write access to the V_DB is limited to the RIMman only, so that the PVE cannot write to the V_DB. The RIMman is of special importance with regard to security, because it manages the (SHO-CN) external trust relationships necessary for PVM.

The PVM also includes a Configuration Policy manager (CPman) that performs management and provisioning of device configurations. It also manages policies, in particular, ingestion of foreign configurations and policies, for example from a trusted third party (TTP) and generation of (operator specific) target device configurations and policies. That is, the CPman is the unique entity, which is authorized to manage the configuration policy database C_DB. The CPman is of special importance with regard to security, because it manages the (SHO-CN) external trust relationships necessary for PVM.

Figure 17A:
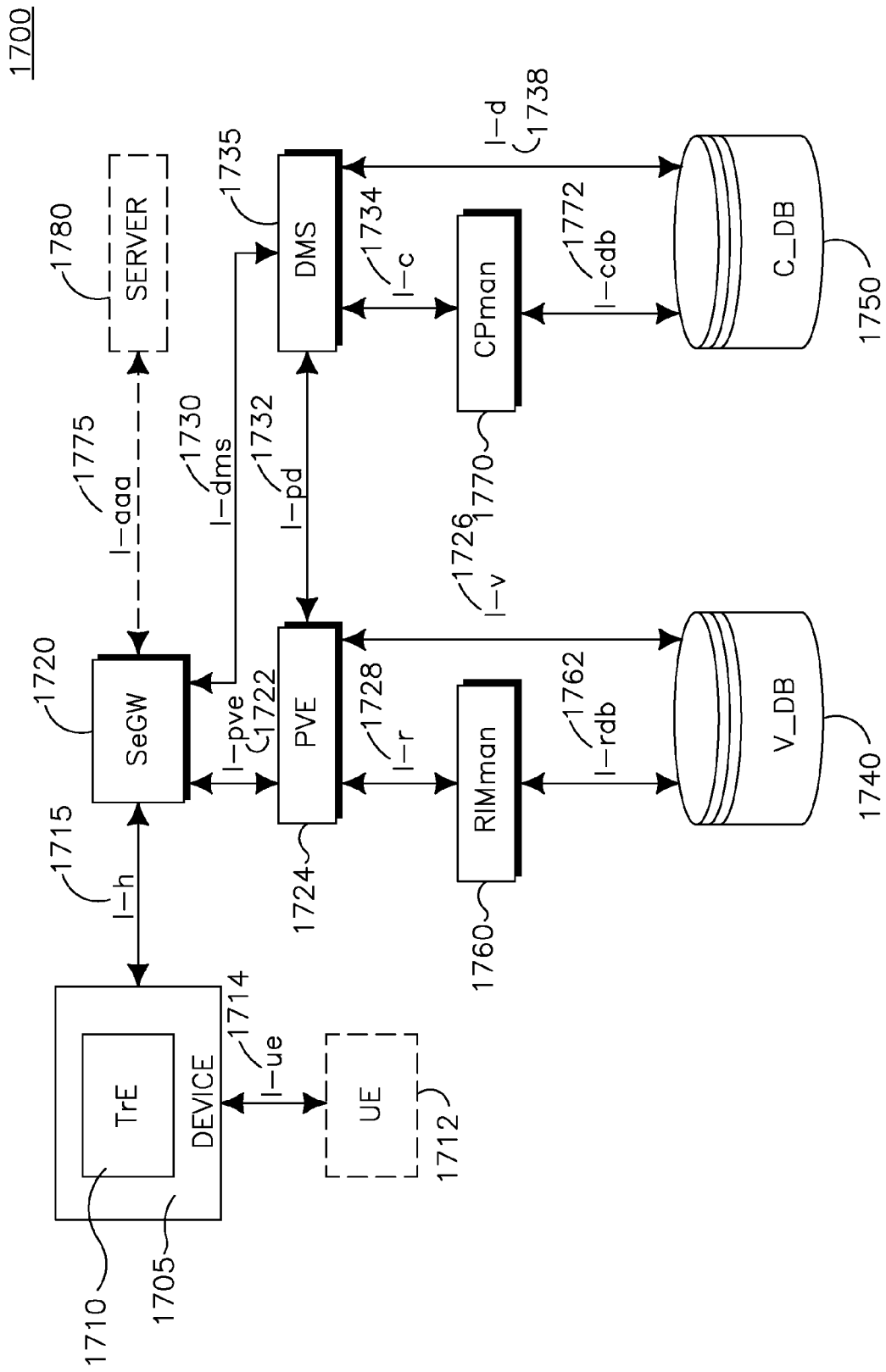
FIG. 17A is a block diagram showing an example set of entities and their relationships and interfaces for platform validation and management (PVM)
Figure 17B:
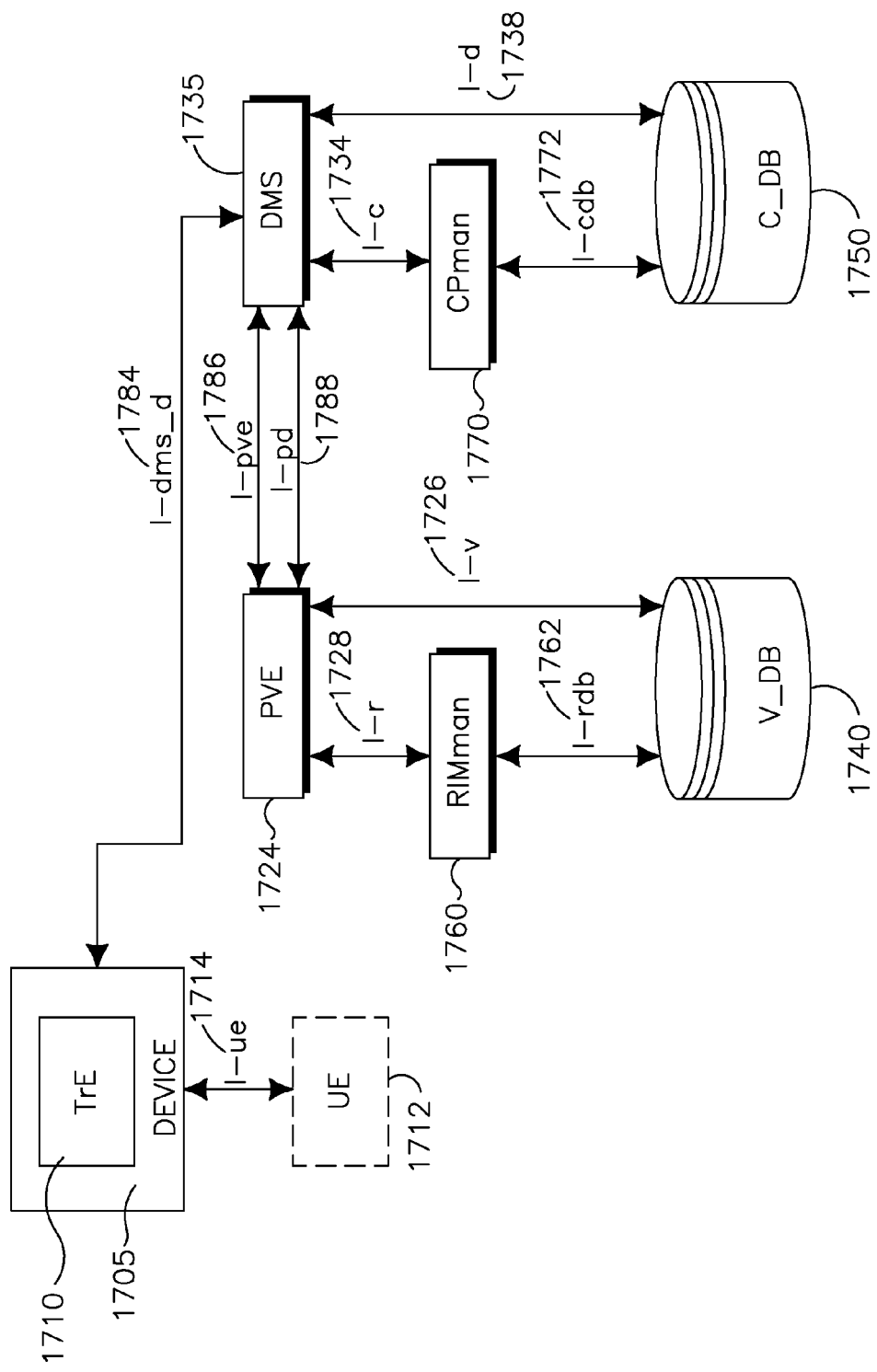
FIG. 17B is a block diagram showing another example set of entities and their relationships and interfaces for PVM.

FIGS. 17A and 17B show examples of the minimum set of entities, their relationships and interfaces for PVM. Additional entities, such as the Authentication, Authorization & Accounting (AAA) server and the wireless transmit/receive unit (WTRU) and their interfaces, are shown.

The PVM architecture or system 1700 of FIG. 17A includes a device 1705 having a TrE 1710. A WTRU 1712 (or user entity (UE)) may be in communications with device 1705 via an I-ue interface 1714. The device 1705 communicates with a SeGW 1720 via an I-h interface 1715. In general, the interface I-h 1715 between the device 1705 and the SeGW 1720 may be unprotected and special measures may be applied to secure this channel for authenticity, integrity and, optionally, confidentiality. I-h 1715 may be used to establish the link between the device 1705 and the SeGW 1720 and thus the CN. For example, the SeGW 1720 may communicate with a AAA server via interface I-aaa 1775. The operator may have established appropriate measures to ensure the security of the interfaces.

An I-pve interface 1722 may be used by the SeGW 1720 to contact the PVE 1724 during validation. The PVE 1724 may use I-pve interface 1722 to signal the outcome of validation to the SeGW 1720. The I-dms interface 1730 may be used for device configuration related communication between the DMS 1735 and the SeGW 1720. The I-pd interface 1732 may be used by the PVE 1724 to communicate with the DMS 1735 and vice-versa. This interface, the I-pd 1732, may be used during device management procedures, such as for device software updates and configuration changes.

The interfaces I-v 1726 and I-d 1738 may be used by the PVE 1720 to read RIMs from the V_DB 1740 and by the DMS 1735 to read allowed configurations from the C_DB 1750, respectively. The interfaces I-r 1728 and I-c 1734 may be used by the PVE 1720 to communicate to the RIMman 1760, such as in case of missing RIMs in the V_DB 1740, and by the DMS 1735 to communicate with the CPman 1770. The RIMman 1760 and the CPman 1770 may use the interfaces I-rdb 1762 and I-cdb 1772 to read, write, and manage the validation of the database V_DB 1740 and the configuration policy database C_DB 1750, respectively.

FIG. 17B illustrates a PVM 1782 where the device 1705 may connect directly to the DMS 1735. When the device is a H(e)NB, the DMS 1735 would be a H(e)MS as described herein earlier. For example, in the case of a fallback mode in which the device 1705 is not capable of performing the security protocols with the SeGW. In this case, the DMS 1735 may act as the point of first contact for the device 1705 via an interface I-dms_d 1784 and communicate with the PVE 1724 via interfaces I-pve 1786 and I-pd 1788 to perform a validation, or at least to get to know which components have failed during secure start-up. The DMS 1735 may act upon this information for remediation.

As stated herein, PVM may use any version of validation. Described herein is an embodiment of semi-autonomous validation (SAV) that works with PVM. We focus on the advanced validation method of Semi Autonomous Validation (SAV). Advantages of this solution for SAV are further that the CN is protected completely from rogue devices. During SAV, a quarantine is effectively established by the SeGW. No direct threats are posed to PVE and DMS from the device, since they receive only data limited to their tasks and only over secure connections with the SeGW, or established by the SeGW. The validation process in SAV does not require a direct communication between devices and any entity in the CN. Only after a successful validation using SAV, connections to the CN are allowed. This ensures that only devices in a proven secure state can communicate to entities inside the CN.

Figure 18A:
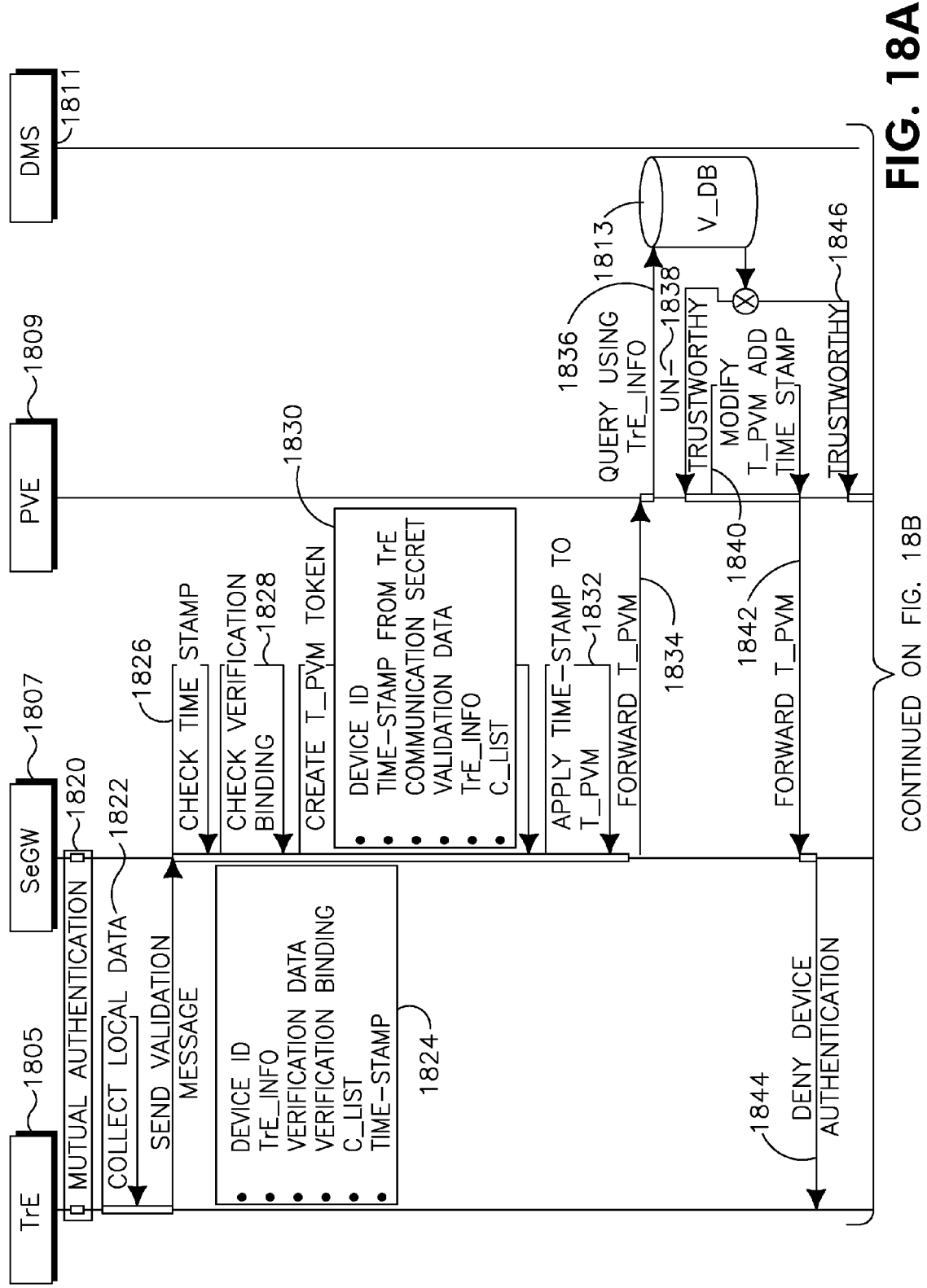
FIGS. 18A, 18B and 18C are a signal diagram of an example method of validation using a platform validation entity.
Figure 18B:
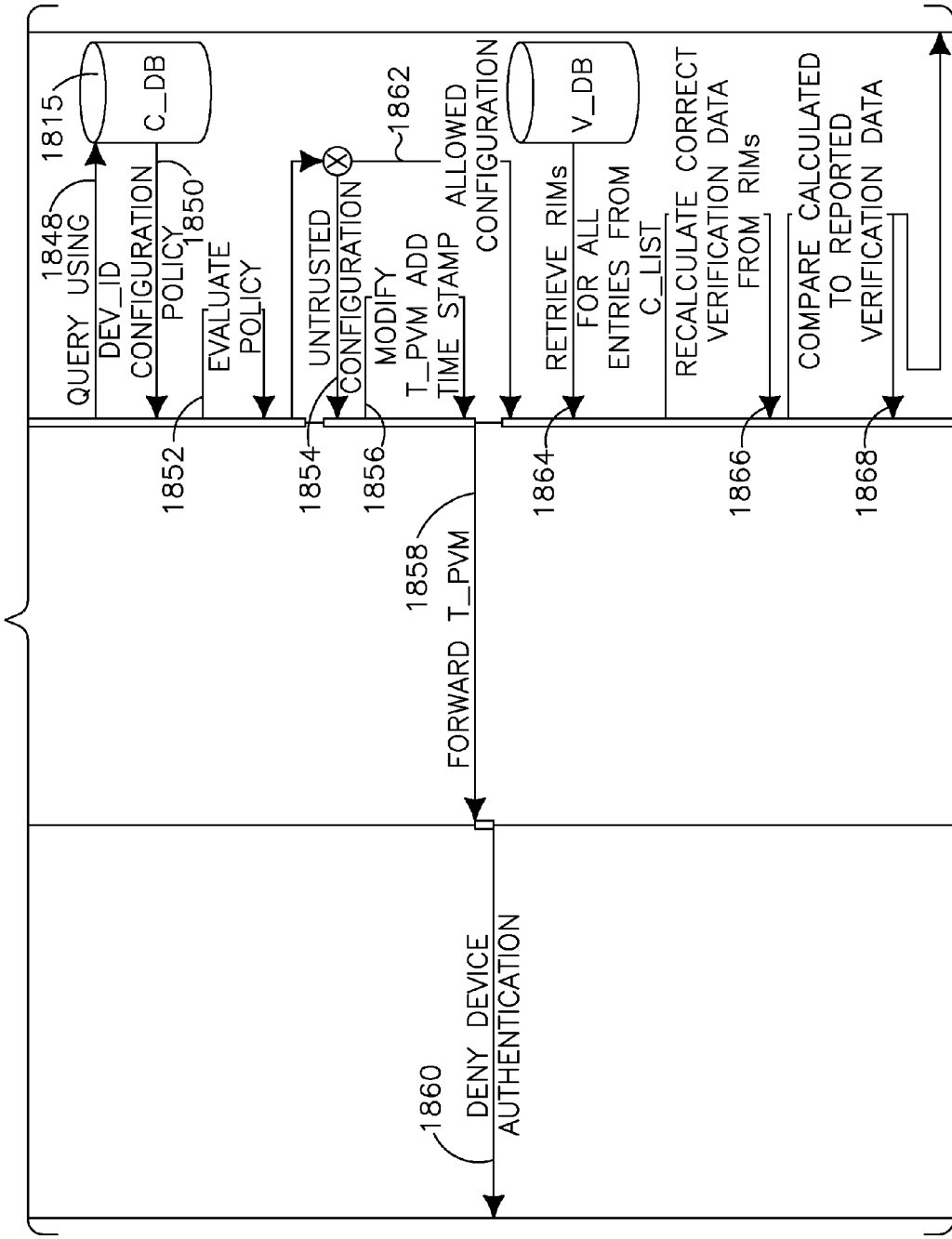
Figure 18C:
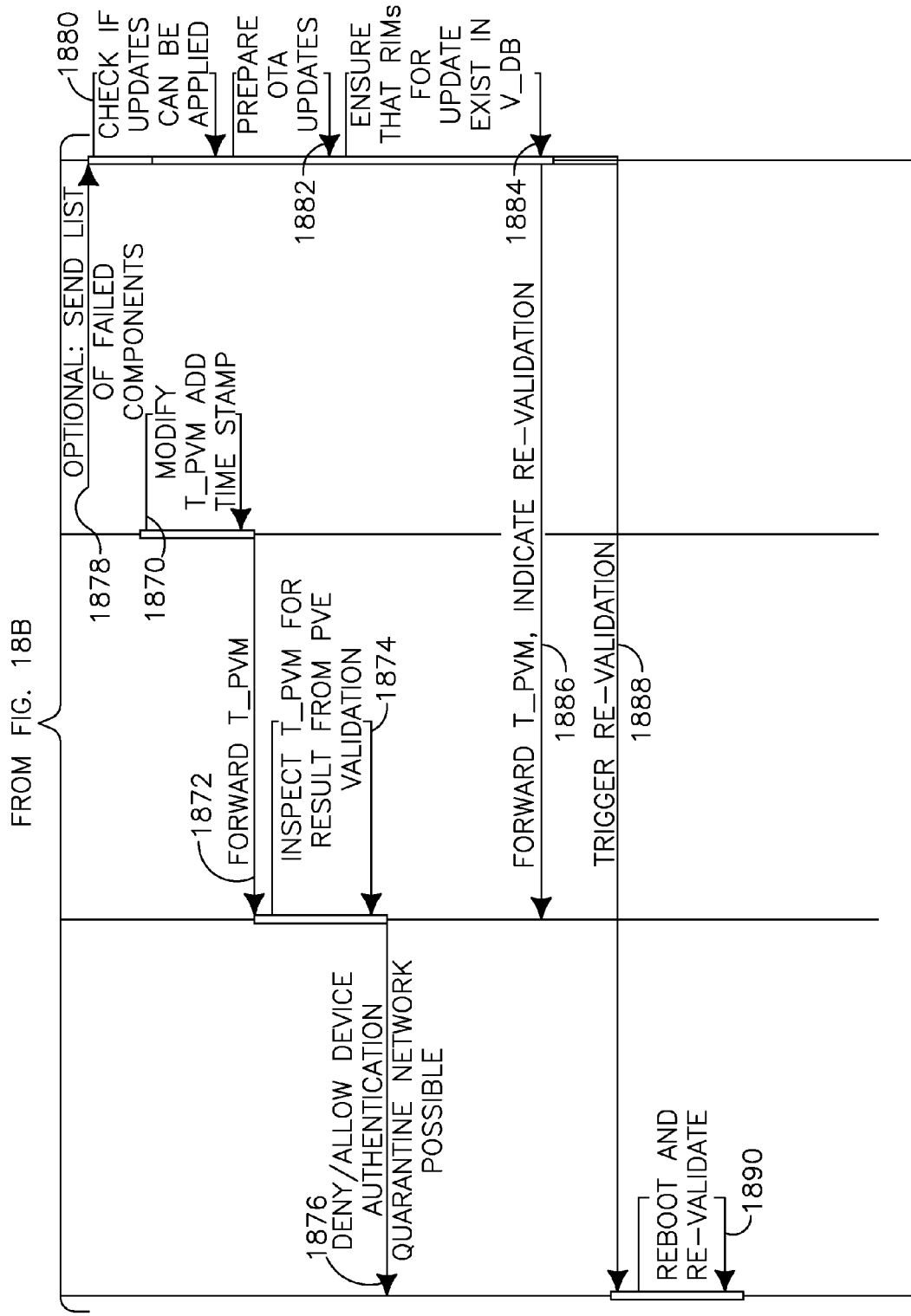

FIGS. 18A, 18B and 18C show a diagram of an example of a SAV validation method with a PVM infrastructure. The PVM infrastructure includes the entities described herein including a TrE 1805, a SeGW 1807, a PVE 1809, a DMS 1811, a V_DB 1813 and C_DB 1815. Following mutual authentication (1820), the TrE 1805 may collect some or all of the following data: device information such as Dev_ID, manufacturer, Device capabilities including, but not limited to, communications capabilities such as data rates supported, transmit power levels, signaling features and other capabilities, TrE capabilities and properties including RoT; TrE_information including ID, certification info, manufacturer, build version, and optionally model, make, serial-no.; verification data including 1) a list of failed functionalities of the device, and/or 2) platform configuration register (PCR) values; verification binding such as signature over PCR values or the list of failed device functionalities; ordered list of component indicators (CInd) to components Clist and may include parameters for components; and time-stamps (trusted or not) (1822). A validation message/data from the TrE 1805 to the SeGW 1807 may include the above date (1824).

SeGW 1807 shall check/compare timestamps received with local time to detect variations (1826). If the reported time-stamp does not match the local time, the SeGW acts according to the properties of the reported time-stamp. If the device's time-stamp is a trusted time-stamp and shows a variation, SeGW 18070 should trigger a revalidation of the TrE and its trusted time source. In the case of a non-trusted time-stamp, the SeGW 1807 adds its own trusted time-stamp to the message. If the device is not capable of providing trusted time stamps, the SeGW 1807 may add a trusted time-stamp as a protection against replay attacks.

Upon receipt of this message, the SeGW 1807 may check if verification binding in the form of signature from a TrE is present (1828). This ensures the authenticity of the verification data. The SeGW 1807 then creates a PVM token (T_PVM) (1830) and applies a timestamp on the T-PVM before sending it to assure freshness and prevent asynchronous message flows (1832).

SeGw 1807 forwards the T_PVM to the PVE 1809 (1834) which in turn queries the V_DB 1813 using TrE-info (1836). If an untrustworthy determination is returned to the PVE 1809 (1838), the PVE then applies a time stamp to the T_PVM (1840) and forwards it to the SeGW 1807 (1842). The SeGW 1807 sends a denial of device authentication to the TrE 1805 (1844).

If a trustworthy determination is returned to the PVE 1809 (1846), the PVE queries the C_DB using Dev_ID (1848) which in turn returns a configuration policy (1850) to the PVE 1809. The PVE 1809 evaluates the policy configuration (1852).

If the PVE 1809 determines that the configuration is untrustworthy (1854), then the PVE 1809 modifies the T-PVM and applies a time stamp (1856). The PVE 1809 then forwards the T_PVM to the SeGW 1807 (1858), which in turn sends a denial of device authentication to the TrE 1805 (1860).

If the PVE 1809 determines that the configuration is trustworthy and allows the configuration (1862), then the PVE 1809 retrieves the RIMs for all entries in Clist or C_List from V-DB 1813 (1864). The PVE 1809 recalculates the correct verification data from the RIMs (1866) and compares the calculated verification data to the reported verification data (1868). In the case of SAV, the verification data calculated from the RIMs would be in the form of an 'empty list' of failed functionalities. The PVE 1809 then modifies the T-PVM and applies a time stamp (1870). The PVE 1809 then forwards the T_PVM to the SeGW 1807 (1872). The SeGW 1807 inspects the T_PVM (or extracts from the T_PVM) for the PVE validation result (1874). The SeGW 1807 sends a denial or allowance of device authentication to the TrE 1805 (1876). If the PVE validation result is negative, then TrE 1805 performs a re-boot and does a revalidation (1890).

Optionally, after the PVE 1809 compares the calculated verification data to the reported verification data (1868), the PVE 1809 may send a list of failed components to the DMS 1811 (1878). If the list of failed components is not empty, then the DMS 1811 may determine that an update of software or firmware may be applied (1880), and if so prepares the OTA updates (1882). The DMS 1811 also ensures that RIMs for the updates exist in the V_DB 1813 (1884). The DMS 1811 sends the T_PVM with an indication for revalidation to the SeGW 1807 (1886) and a revalidation trigger to TrE 1805 (1888). TrE 1805 performs a re-boot and does a revalidation (1890).

Details with respect to the processing in FIGS. 18A, 18B and 18C are described herein. To perform platform validation, the TrE collects the following data and communicates it to the SeGW: device information such as Dev_ID, manufacturer, TrE capabilities and properties including RoT; TrE_information including ID, certification info, manufacturer, build version, and optionally model, make, serial-no.; integrity verification data (IVD where an example of IVD may be signed platform configuration register (PCR) values and another example may be simply a list of components or functionalities whose integrity has been checked by a device-local integrity check process, and further has been assessed as having failed such device-local integrity checks; verification binding such as signature over PCR values; Clist—which is an ordered list of component indicators (CInd) to components Clist and may include parameters for components; The list of components will serve to identify the RIMs for validation, for example, by pointing to RIM certificates, RIMcs. The ordered list of indicators to components and their parameters would contain entries such as the following data fields: index, component_indicator CInd, component_parameters. CInd gives a reference to the component and may be in URN format (for example URN://vendor.path.to/component/certificate). Optional: time-stamp (this could be a trusted timestamp, or a normal timestamp that may not be necessarily trusted in general)

In the case of the device, the validation message may additionally contain device information, such as, ID, certification information, manufacturer, model, version, make, serial-no., TrE capabilities and properties including RoT, security policies of devices, modules which are integrity checked at different stages of a multi-step process of integrity checking and post-checking component loading, HW build version number, and optionally SW build version number and integrity measurement data).

The use of RIMs for validation is a preferred but optional method for SAV. It is used here as the base case, from which other options depart and deviate. For instance, there are validations without recalculating verification data from RIMs, and there is even the possibility to do the performing PVM completely without RIMs.

Verification binding may be optional if validation message is bound to authentication by means other than those involving integrity of the device, e.g., by the presence and use of a secure channel.

SeGW may check/compare timestamp received with local time to detect variations. If the reported time-stamp does not match the local time, the SeGW acts according to the properties of the reported time-stamp. If the device's time-stamp is a trusted time-stamp and shows a variation, SeGW may trigger a revalidation of the TrE and its trusted time source. In the case of a non-trusted time-stamp, the SeGW adds its own time-stamp to the message.

TrE_info may be optional. Dev_ID may give a reference to TrE_info. Since not all MNOs will know all TrE's, and thus all TrE_info data, such a mapping may be provided by a database which may be queried by the MNOs to obtain the TrE_info for any given Dev_ID. TrE_info may be in a TrE_certificate. The TrE_certificate should be signed by the vendor of the TrE or a TTP, for example german BSI.

The use of URNs as indicators to components (CInd) is advantageous because it concurrently allows for this unique identification of a component and the location from where a RIM or a RIM certificate may be fetched.

The SeGW creates a PVM token (T_PVM) that may be used as a rolling token and is passed from entity to entity during communication. Every entity puts a timestamp on the token before sending it to assure freshness and prevent asynchronous message flows. Time stamps on the token may be used to provide a method to follow the state of the token. The token may travel in the CN from entity to entity, even in several rounds, and therefore may be tracked by the entities. Optionally, the entity ID may be incorporated into the chain of time stamped data.

The T_PVM may contain the Dev_ID. If the original timestamp is not present or not trusted, the T_PVM may also contain a new timestamp issued by the SeGW. Otherwise the T_PVM may contain the original timestamp from the validation message.

Timestamps may be used to protect against replay attacks. They may be combined with, or even replaced by nonces or monotonically increasing counters. Timestamps may also be used to assess the freshness of validation data. The combination of both purposes is advantageous and may be provided by time-stamps.

In a first variant, for later device management by the DMS, T_PVM may contain a communication secret for building a secure tunnel between DMS and TrE, for instance a TLS certificate.

The SeGW maintains a token database T_DB containing all active T_PVM.

The SeGW extracts the following data from the validation message: validation data, TrE_info, and Clist. Before sending this data together with the token T_PVM, the SeGW puts a timestamp on the T_PVM and forwards it to the PVE. The SeGW may check the format of the validation messages and parts thereof to mitigate the threat from mal-formed data attacks. Otherwise, an attacker may try to modify the data in the validation message of a compromised TrE such that the pure inspection of this data at the PVE would lead to a system error or failure.

The PVE is the entity deciding on the validity of a device. That is, in the language of policy systems, it is a policy decision point (PDP). Under the strict separation of duty approach, it is the only PDP in the PVM system. It relies on SeGW and DMS to enforce policies, such as to act as a Policy Enforcement Point (PEP). PVM remains, in its general description, agnostic to the question of how policies are generated and where they are stored/managed, such as, where PVE gets the policies from. In some of the more detailed variants and subordinate methods described below (in particular parametric validation and minimal validation), some examples of policy conditions and actions are given. In general, decisions on the validation policy can be based not only on the validity of single components but also on the other data contained in Clist. In particular, allowed parameter (range), and order of load (Clist is ordered) may be evaluated.

There are some fundamental classes of failure conditions that may occur in the validation process executed by the PVE. For example, failure condition F1 indicates a "TrE invalid" scenario. By its authenticated Dev_ID and the delivered TrE_info, the PVE identifies the device and/or its TrE as one which is not trustworthy. Note: Information that can be used to determine if the TrE may be invalid of not may be carried on the SAV validation message itself, or may be deduced from other messages or other means. In its basic form, the presence of a SAV validation message may implicitly indicate that the TrE itself must be valid. Details of how F1 may be detected are discussed in U.S. patent application Ser. No. 12/718,480, filed concurrently, and entitled "Platform Validation and Management of Wireless Devices", which is incorporated by reference as if fully set forth herein.

Another example is failure condition F2 which indicates three scenarios for "IVD Verification failure". Scenario F2a indicates integrity measurement/verification data mis-match. It indicates failure of the secure start-up process of the device, and/or presence of false and/or expired RIMs and/or RIM certificates on the device, which then starts an invalid component. Scenario F2b indicates RIM Missing, i.e., a RIM for a component is missing and needs to be fetched from elsewhere. Scenario F2c indicates an expired RIM certificate.

Failure condition F3 indicates two scenarios for "Clist policy failure". For scenario F3a, single components are valid, but the configuration fails a policy, for instance on load order, or undesired components, or parameters. Scenario F3b indicates configuration is unknown, such that a 'known good value' for Clist is not available.

Described herein is a method of detection and treatment of failure condition class F2. For failure condition F2, the PVE fetches RIMs from the V_DB for all components from the received Clist. The validation database V_DB only stores certified RIMs. The corresponding RIM certificates have to be stored securely in the V_DB.

If the IVD is in the form of a simple list of "components of the device that correspond to components of the device that have failed local integrity checking", as described for the narrowly defined SAV procedure described herein, then the IVD_ref will be simply in the form of a null list. That is, the IVD_ref should, in this case, be nothing more than the expected list of failed functionalities, which should be a null table if every component is expected to have passed device-local integrity checking.

If the IVD_ref does not match the received IVD, the secure startup process on the device has been compromised or wrong RIMs are stored in the device, and invalid components have thus been loaded in the secure start up process.

Depending on the F2a policy, several options may apply upon detection of a F2a failure. In one option, rejection. The PVE signals the outcome of the validation to the SeGW. SeGW may then deny network access or put the device into a quarantine network. A second option is update. After receiving the validation result (T_PVM) indicating the verification data failure, the DMS starts a management process to replace the components which failed validation. Details of such a remediation process are discussed in U.S. patent application Ser. No. 12/718,480, filed concurrently, and entitled "Platform Validation and Management of Wireless Devices", which is incorporated by reference as if fully set forth herein.

If no policy failure condition is met, the device is valid. The PVE signals this to the SeGW, which then allows connection to the CN.

For failure condition F2b, where the RIM is missing, this could happen either because the RIM may be missing in the V_DB, or it may be missing in the Device (so that, in this case, the device will not be able to perform the device-local integrity checking procedure). Details of how F2 may be detected and treated are discussed in U.S. patent application Ser. No. 12/718,480, filed concurrently, and entitled "Platform Validation and Management of Wireless Devices", which is incorporated by reference as if fully set forth herein.

Described herein are methods for the detection and treatment of failure condition class F3. The F3 failure condition occurs if either single components are valid but the configuration of the components fails a policy (e.g. loading order mismatch), or if the configuration is unknown, i.e., a 'known good valud' for Clist is not available. Details of how such a failure condition can take place and how such a failure condition can be treated is discussed in U.S. patent application Ser. No. 12/718,480, filed concurrently, and entitled "Platform Validation and Management of Wireless Devices", which is incorporated by reference as if fully set forth herein.

Figure 19:
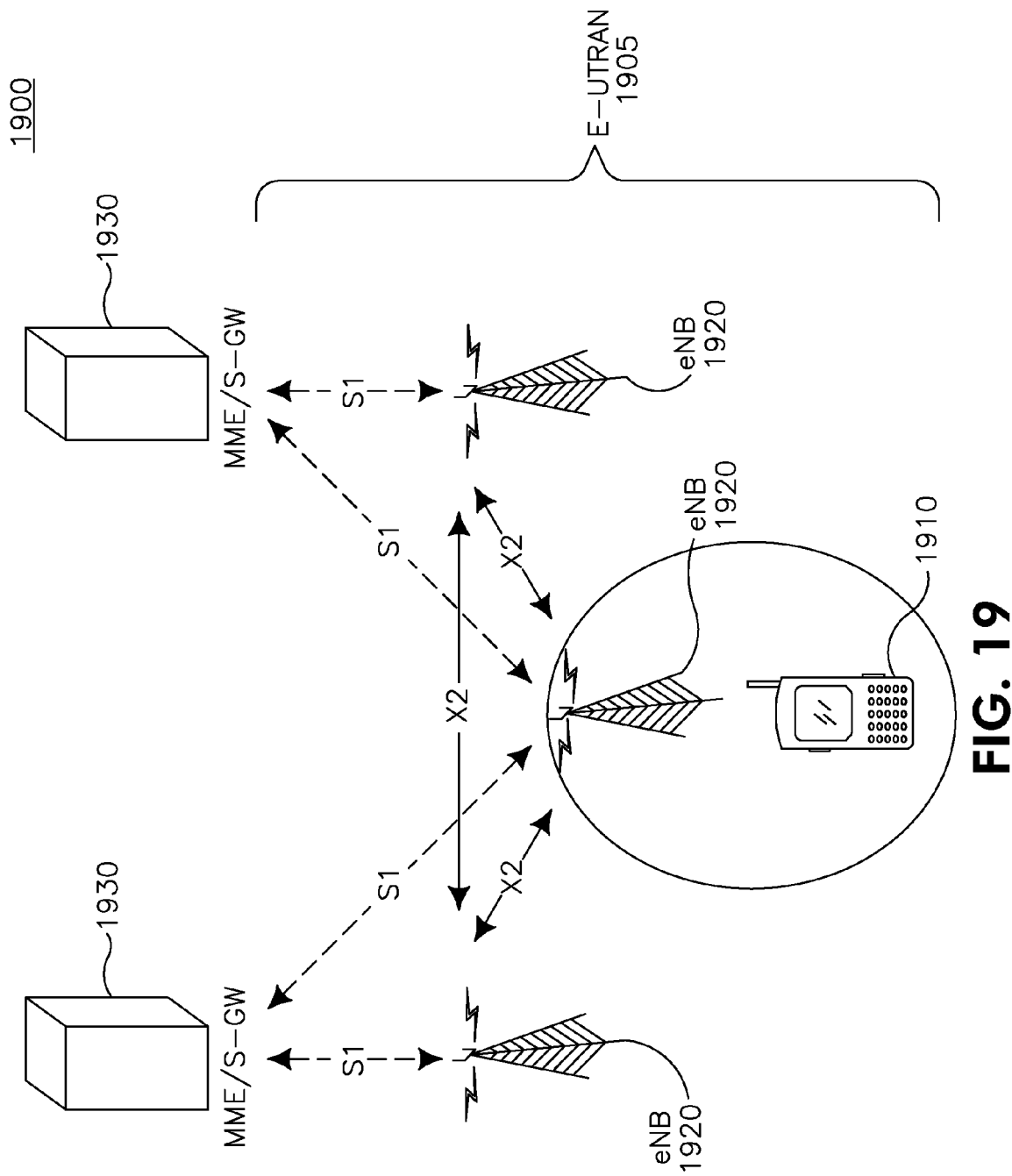
FIG. 19 shows a Long Term Evolution (LTE) wireless communication system/access network.

FIG. 19 shows a Long Term Evolution (LTE) wireless communication system/access network 1900 that includes an Evolved-Universal Terrestrial Radio Access Network (E-UTRAN) 1905 that may be used with a H(e)NB. The E-UTRAN

1905 includes a WTRU 1910 and several evolved Node-Bs, (eNBs) 1920. The WTRU 1910 is in communication with an eNB 1920. The eNBs 1920 interface with each other using an X2 interface. Each of the eNBs 1920 interface with a Mobility Management Entity (MME)/Serving GateWay (S-GW) 1930 through an S1 interface. Although a single WTRU 1910 and three eNBs 1920 are shown in FIG. 19, it should be apparent that any combination of wireless and wired devices may be included in the wireless communication system access network 100.

Figure 20:
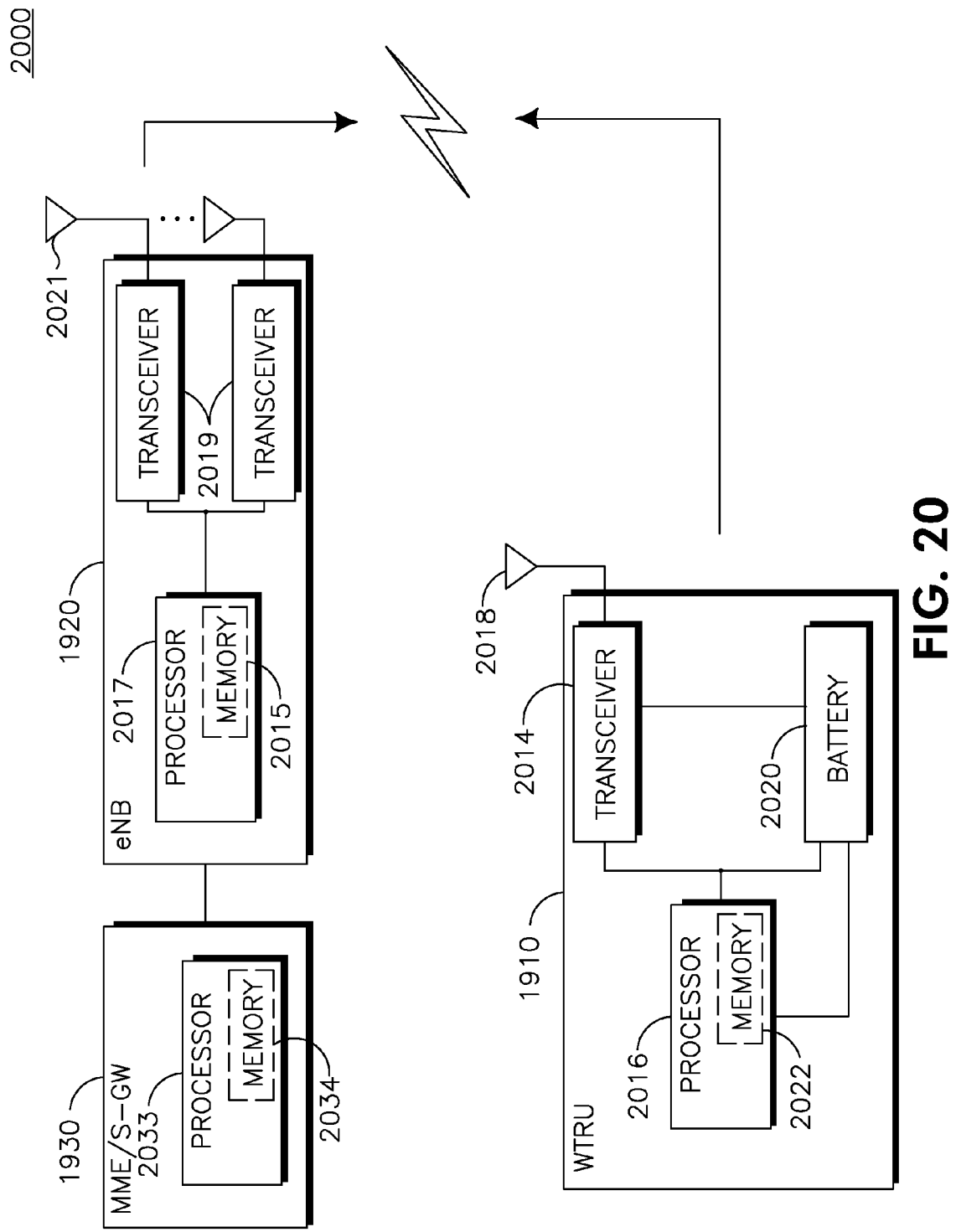
FIG. 20 is an exemplary block diagram of an LTE wireless communication system.

FIG. 20 is an exemplary block diagram of an LTE wireless communication system 2000 including the WTRU 1910, the eNB 1920, and the MME/S-GW 1930. As shown in FIG. 20, the WTRU 1910, the eNB 1920 and the MME/S-GW 1930 are configured to perform a method of H(e)NB integrity verification and validation using autonomous and semi-autonomous validation.

In addition to the components that may be found in a typical WTRU, the WTRU 1910 includes a processor 2016 with an optional linked memory 2022, at least one transceiver 2014, an optional battery 2020, and an antenna 2018. The processor 2016 is configured to perform a method of H(e)NB integrity verification and validation using autonomous and semi-autonomous validation. The transceiver 2014 is in communication with the processor 2016 and the antenna 2018 to facilitate the transmission and reception of wireless communications. In case a battery 2020 is used in the WTRU 1910, it powers the transceiver 2014 and the processor 2016.

In addition to the components that may be found in a typical eNB (including a H(e)NB), the eNB 1920 includes a processor 2017 with an optional linked memory 2015, transceivers 2019, and antennas 2021. The processor 2017 is configured to perform a method of H(e)NB integrity verification and validation using autonomous and semi-autonomous validation. The transceivers 2019 are in communication with the processor 2017 and antennas 2021 to facilitate the transmission and reception of wireless communications. The eNB 1920 is connected to the Mobility Management Entity/Serving GateWay (MME/S-GW) 1930 which includes a processor 2033 with an optional linked memory 2034.

The SeGW and PVE, although not shown in FIGS. 19 and 20, in addition to the components that may be found in a typical SeGW and PVE, may include a processor with an optional linked memory, transceiver(s), antenna(s), and communication ports. The processor is configured to perform platform validation and management functions to implement PVM methodology. The transceivers and communication ports are in communication with the processor and antennas, as needed, to facilitate the transmission and reception of communications.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing integrity verification of a wireless transmit/receive unit (WTRU), comprising the following steps performed at the WTRU:
   measuring, at the WTRU, integrity metrics for at least a component of the WTRU;
   retrieving, at the WTRU, a trusted reference value (TRV) for the at least one component from local storage on the WTRU;
   comparing, at the WTRU, the measured integrity metrics against the TRV to determine a result of an integrity verification check of the at least one component; and
   upon a failed integrity verification check of the at least one component, determining a course of action based on a locally provisioned policy.

2. The method recited in claim 1, further comprising:
   mapping the at least one component that failed the integrity verification check to a functionality to produce a device independent classification of functionality affected by the failed integrity verification check of the at least one component on the WTRU; and
   reporting the results of the integrity verification check of the at least one component to a platform validation entity (PVE), and sending the device independent classification of functionality affected by the failed integrity check of the at least one component to the PVE.

3. The method recited in claim 2, wherein the PVE and the WTRU are separate entities on a network.

4. The method recited in claim 3, wherein reporting the results of the integrity verification check to the PVE includes sending a device identifier for the WTRU.

5. The method recited in claim 1, further comprising determining a severity classification associated with the failed integrity verification check and performing predetermined actions based on the determined severity classification.

6. The method recited in claim 5, wherein a determination of a first severity classification results in rebooting the WTRU with a fallback code image (FBC).

7. The method recited in claim 6, wherein determination of a second, different severity classification may result in performance of a limited subset of functionality of the WTRU.

8. The method recited in claim 7, wherein upon determination of another severity classification, replacement of the failed component is carried out via an immediate update procedure.

9. The method recited in claim 7, wherein upon determination of another severity classification, replacement of the failed component is carried out as part of a normal update schedule.

10. The method recited in claim 6, wherein the FBC has the capability of basic communications with a core network and a capability to send a distress signal to the core network, the distress signal containing an error code information element indicating details of the failed integrity verification check.

11. The method recited in claim 10, wherein the distress signal comprises a combination of information elements including one or more of a device identifier for the WTRU, an event field containing information about the failed integrity validation check, and a time field containing an indication of the current date and time known to the WTRU.

12. The method recited in claim 2, wherein the device independent classification of functionality includes at least one of version information, device model information, or serial number.

13. A wireless transmit/receive unit (WTRU) adapted to:
measure integrity metrics for at least a component of the WTRU;
retrieve a trusted reference value (TRV) for the at least one component from local storage on the WTRU;
compare the measured integrity metrics against the TRV to determine a result of an integrity verification check of the at least one component; and
upon a failed integrity verification check of the at least one component, determine a course of action based on a locally provisioned policy.

14. The WTRU recited in claim 13, wherein the WTRU is further adapted to:
map the at least one component that failed the integrity verification check to a functionality to produce a device independent classification of functionality affected by the failed integrity verification check of the at least one component on the WTRU; and
report the results of the integrity verification check of the at least one component to a platform validation entity (PVE), and sending the device independent classification of functionality affected by the failed integrity check of the at least one component to the PVE.

15. The WTRU recited in claim 14, wherein the PVE and the WTRU are separate entities on a network.

16. The WTRU recited in claim 14, wherein reporting the results of the integrity verification check to the PVE includes sending a device identifier for the WTRU.

17. The WTRU recited in claim 13, wherein the WTRU is further adapted to determine a severity classification associated with the failed integrity verification check and performing predetermined actions based on the determined severity classification.

18. The WTRU recited in claim 17, wherein a determination of a first severity classification results in rebooting the WTRU with a fallback code image (FBC).

19. The WTRU recited in claim 18, wherein determination of a second, different severity classification may result in performance of a limited subset of functionality of the WTRU.

20. The WTRU recited in claim 19, wherein upon determination of another severity classification, replacement of the failed component is carried out via an immediate update procedure.

21. The WTRU recited in claim 18, wherein upon determination of another severity classification, replacement of the failed component is carried out as part of a normal update schedule.

22. The WTRU recited in claim 18, wherein the FBC has the capability of basic communications with a core network and a capability to send a distress signal to the core network, the distress signal containing an error code information element indicating details of the failed integrity verification check.

23. The WTRU recited in claim 22, wherein the distress signal comprises a combination of information elements including one or more of a device identifier for the WTRU, an event field containing information about the failed integrity validation check, and a time field containing an indication of the current date and time known to the WTRU.

24. The WTRU recited in claim 14 wherein the device independent classification of functionality includes at least one of version information, device model information, or serial number.

* * * * *